(12) United States Patent
Kumagai et al.

(10) Patent No.: US 7,925,403 B2
(45) Date of Patent: Apr. 12, 2011

(54) CONTROL METHOD FOR OCCUPANT RESTRAINT APPARATUS AND OCCUPANT RESTRAINT APPARATUS

(75) Inventors: Masayoshi Kumagai, Tokyo (JP); Kazuhiro Abe, Tokyo (JP)

(73) Assignee: Takata Corporation, Tokyo (JP)

( * ) Notice: Subject to any disclaimer, the term of this patent is extended or adjusted under 35 U.S.C. 154(b) by 424 days.

(21) Appl. No.: 12/047,971

(22) Filed: Mar. 13, 2008

(65) Prior Publication Data
US 2008/0243343 A1 Oct. 2, 2008

(30) Foreign Application Priority Data
Mar. 30, 2007 (JP) ................................ 2007-093232

(51) Int. Cl.
*B60R 22/00* (2006.01)
(52) U.S. Cl. ............ 701/45; 280/735; 180/271; 340/436
(58) Field of Classification Search ................. 701/45, 701/46, 96, 301; 280/735; 180/271; 340/436
See application file for complete search history.

(56) References Cited

U.S. PATENT DOCUMENTS

| | | | |
|---|---|---|---|
| 5,388,860 A | 2/1995 | Brede et al. | |
| 5,413,378 A | 5/1995 | Steffens, Jr. et al. | |
| 6,145,878 A | 11/2000 | Weikl | |
| 6,188,940 B1 | 2/2001 | Blackburn et al. | |
| 6,290,257 B1 | 9/2001 | Bunce et al. | |
| 6,623,033 B2 * | 9/2003 | Breed | 280/735 |
| 6,648,371 B2 | 11/2003 | Vendely et al. | |
| 6,832,778 B2 | 12/2004 | Pinsenschaum et al. | |
| 7,108,280 B2 * | 9/2006 | Abe | 280/734 |
| 7,138,938 B1 * | 11/2006 | Prakah-Asante et al. | 342/70 |
| 7,236,865 B2 * | 6/2007 | Prakah-Asante et al. | 701/45 |
| 7,245,998 B2 * | 7/2007 | Ogata et al. | 701/45 |

FOREIGN PATENT DOCUMENTS

GB 2 315 467 A 2/1998

* cited by examiner

*Primary Examiner* — Mark Hellner
(74) *Attorney, Agent, or Firm* — Fitch Even Tabin & Flannery

(57) ABSTRACT

A method and apparatus for controlling an occupant restraint apparatus are provided which allow the force applied to a nearby occupant to be optimized in response to collision conditions. In one form, a method for controlling an occupant restraint apparatus includes detecting an obstacle in a travelling direction of a vehicle that may potentially collide with the vehicle; predicting a type of collision between the obstacle detected and the vehicle; setting conditions for expanding an airbag of the vehicle based on the collision type predicted; and controlling the expansion of the airbag and/or gas discharge from the airbag according to the conditions set at the setting step. Detecting the obstacle preferably includes detecting the position and relative speed of the obstacle with respect to the vehicle based on images of views in the travelling direction of the vehicle.

12 Claims, 19 Drawing Sheets

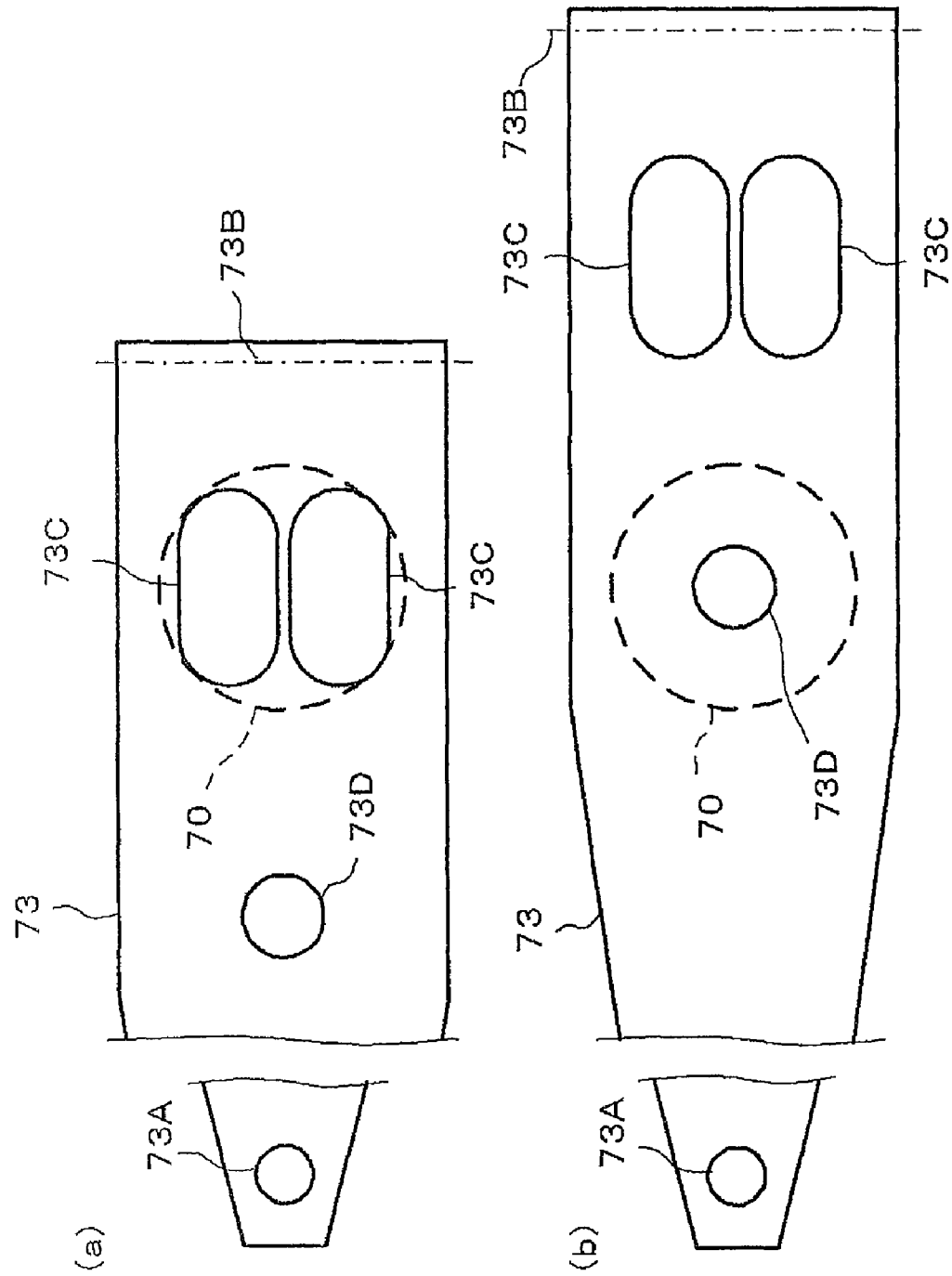

CONTROL METHOD FOR OCCUPANT RESTRAINT APPARATUS AND OCCUPANT RESTRAINT APPARATUS

FIELD OF THE INVENTION

The present invention relates to a control method for an occupant restraint apparatus including an airbag device, and an occupant restraint apparatus.

BACKGROUND OF THE INVENTION

In a vehicle such as an automobile and the like, an airbag is installed in preparation for an eventual collision. The airbag inflates and expands to restrict an occupant upon collision and enables the impact applied to the occupant to be reduced.

Well known airbags are a driver seat airbag and a passenger seat airbag, which are mounted in a steering wheel and a dashboard to restrict the occupants on a driver seat and a passenger seat upon a head-on collision and to reduce the impact applied to the occupants, respectively.

An airbag is normally used together with a seatbelt as an apparatus for restricting an occupant upon collision of a vehicle. The motion of an occupant upon collision varies depending on whether or not the occupant wears a seatbelt. Then, it is proposed to change the expansion mode of an airbag depending on whether or not a seatbelt is worn (for example, refer to Japanese Unexamined Patent Application Publication No. 2000-43672).

As a method of changing the expansion mode of an airbag, for example, there is a method such that a vent hole provided in a bag is closed in an early stage of expansion and is then opened (U.S. Patent Application Publication No. 2003/0020266). There is also a method such that a vent hole provided in a bag is opened in an early stage of expansion and is then closed (U.S. Patent Application Publication No. 2004/0012179). Moreover, there is a method such that expansion size can be changed in plural steps (U.S. Patent Application Publication No. 2004/0012179). In these airbags, gas discharge characteristics are controlled depending on the position and size of an occupant and a state of using a seatbelt.

In addition, the following arts are proposed as attempts to optimize the expansion of an airbag. In Japanese Unexamined Patent Application Publication No. H07-186879, the quantity of gas discharged from an airbag is adjusted depending on the weight and position of a vehicle occupant, and the pressure of the airbag at vehicle collision is controlled. In Japanese Unexamined Patent Application Publication No. 2000-142309, the position of an occupant is detected, and the displacement of the occupant is predicted from an acceleration signal of a collision sensor. And an airbag is expanded based on the predicted displacement.

In Japanese Unexamined Patent Application Publication No. H11-310098, it is described that an opening degree of a gas outlet of an airbag is favorably conformed according to each of occupants. A cross-sectional area of the gas outlet remains unchanged during restricting operation. Instead of that, the cross-sectional area is optimized with respect to the respective occupants at the time before the airbag expands. In Japanese Unexamined Patent Application Publication No. H10-35405, it is described that a controller controls an opening degree of a pressure reducing hole so that the gas pressure for expanding an airbag is always within a normal range even when a gas generator is activated under any temperature condition.

In Japanese Unexamined Patent Application Publication No. 2000-43672, whether or not a discharge port is to be opened is limited to whether or not the seatbelt is worn, so the expansion (release) mode of the airbag is not changed because of occupant weight, collision speed, or the like. Furthermore, being also common to U.S. Patent Application Publication No. 2003/0020266, since the quantity of discharged gas is small in an early stage of expansion and becomes large in a late stage, there is a possibility that the force applied to an occupant becomes large depending on collision speed.

In the case of U.S. Patent Application Publication No. 2004/0012179, thickness restricting control and vent-hole opening degree control are separately constructed and still are concurrently operated; therefore, the structure is complicated. Moreover, since adaptive vents are disposed at two places, the number of manufacturing man-hours is large.

In conventional methods of adjusting airbag expansion, although intended to conform to occupant status, airbag expansion and gas discharge characteristics are not controlled depending on a collision situation. On this account, it is necessary to reduce the force applied to a nearby occupant.

SUMMARY OF THE INVENTION

The present invention addresses the above problems with the object of providing a control method for an occupant restraint apparatus so that the force applied to a nearby occupant is optimized in response to collision conditions.

In order to attain the above object, a control method for an occupant restraint apparatus according to the first aspect of the present invention is characterized in comprising an obstacle detecting step for detecting an obstacle in a travelling direction of a vehicle, the obstacle possibly coming into collision with the vehicle; a collision predicting step for predicting a type of collision between the obstacle detected at the obstacle detecting step and the vehicle; a setting step for setting conditions for expanding an airbag of the vehicle based on the collision type predicted at the collision predicting step; and an expansion controlling step for controlling the expansion of the airbag and/or gas discharge from the airbag according to the conditions set at the setting step.

The obstacle detecting step preferably detects the position and relative speed of the obstacle with respect to the vehicle based on images of views in the travelling direction of the vehicle.

The obstacle detecting step may alternatively detect the position and relative speed of the obstacle with respect to the vehicle using a noncontact distance detecting device.

The collision predicting step preferably predicts any one of collision types including a full-wrap frontal collision, an offset frontal collision, a diagonal collision, a pole frontal collision or a rollover.

The conditions for expanding the airbag, which are set at the setting step, preferably include a threshold value of impact force for activating an inflator of the airbag.

The conditions for expanding the airbag, which are set at the setting step, may preferably include an area of an opening provided in the airbag and time to change the opening area.

Moreover, the conditions for expanding the airbag, which are set at the setting step, may include the time to release a device for restricting the size of the expanded airbag.

The control method for an occupant restraint apparatus may further comprise an occupant detecting step for detecting the status of an occupant of the vehicle before the setting step; wherein the setting step may set the conditions for expanding the airbag based on the collision type and the occupant status.

An occupant restraint apparatus according to the second aspect of the present invention is characterized in an obstacle detecting device for detecting the position and relative speed of an obstacle with respect to a vehicle, the obstacle being in the travelling direction of the vehicle and coming into collision with the vehicle; a collision predicting device for predicting a type of collision between the obstacle detected at the obstacle detecting device and the vehicle; a setting device for setting conditions for expanding an airbag of the vehicle based on the collision type predicted at the collision predicting device; and an expansion controlling device for controlling the expansion of the airbag and/or gas discharge from the airbag according to the conditions set by the setting device.

The occupant restraint apparatus preferably further comprises an occupant detecting device for detecting the status of an occupant of the vehicle; wherein the setting device sets the conditions for expanding the airbag based on the collision type and the occupant status.

According to the method for controlling an occupant restraint apparatus of the present invention, the occupant restraint apparatus can be controlled so that airbag expansion and gas discharge characteristics can be controlled depending on a collision situation, the force applied to a nearby occupant is optimized in response to collision conditions.

BRIEF DESCRIPTION OF THE DRAWINGS

FIGS. 7(a) and 7(b) are views showing an example of a different flap.

DETAILED DESCRIPTION OF THE PREFERRED EMBODIMENTS

Figure 1:
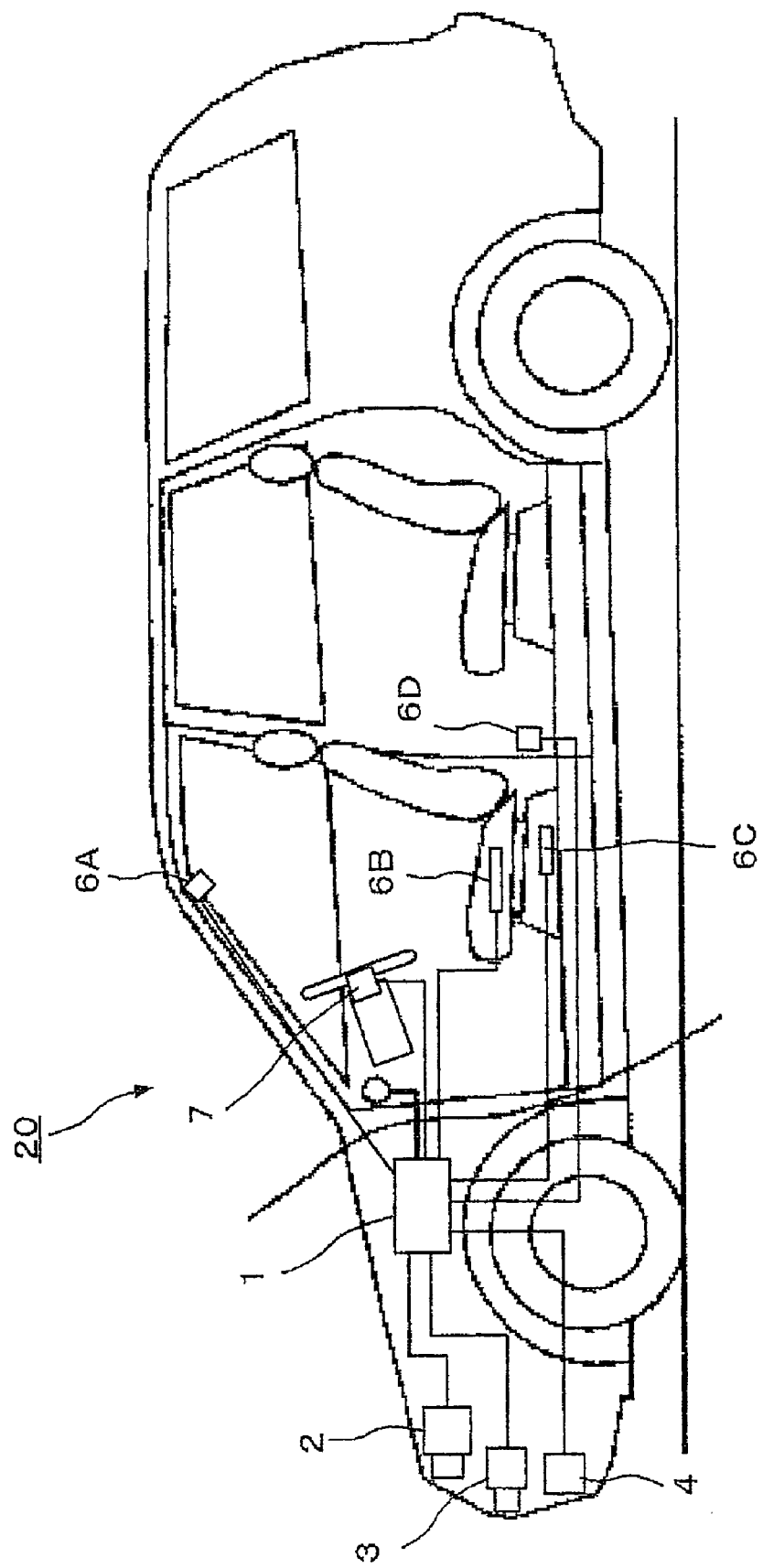
FIG. 1 is a schematic view showing a configuration of an occupant restraint apparatus according to an embodiment of the present invention.

An embodiment of the present invention will now be described in detail with reference to the attached drawings. Identical or equivalent parts are indicated by identical reference characters in the drawings, and the descriptions thereof are not repeated.

Figure 2:
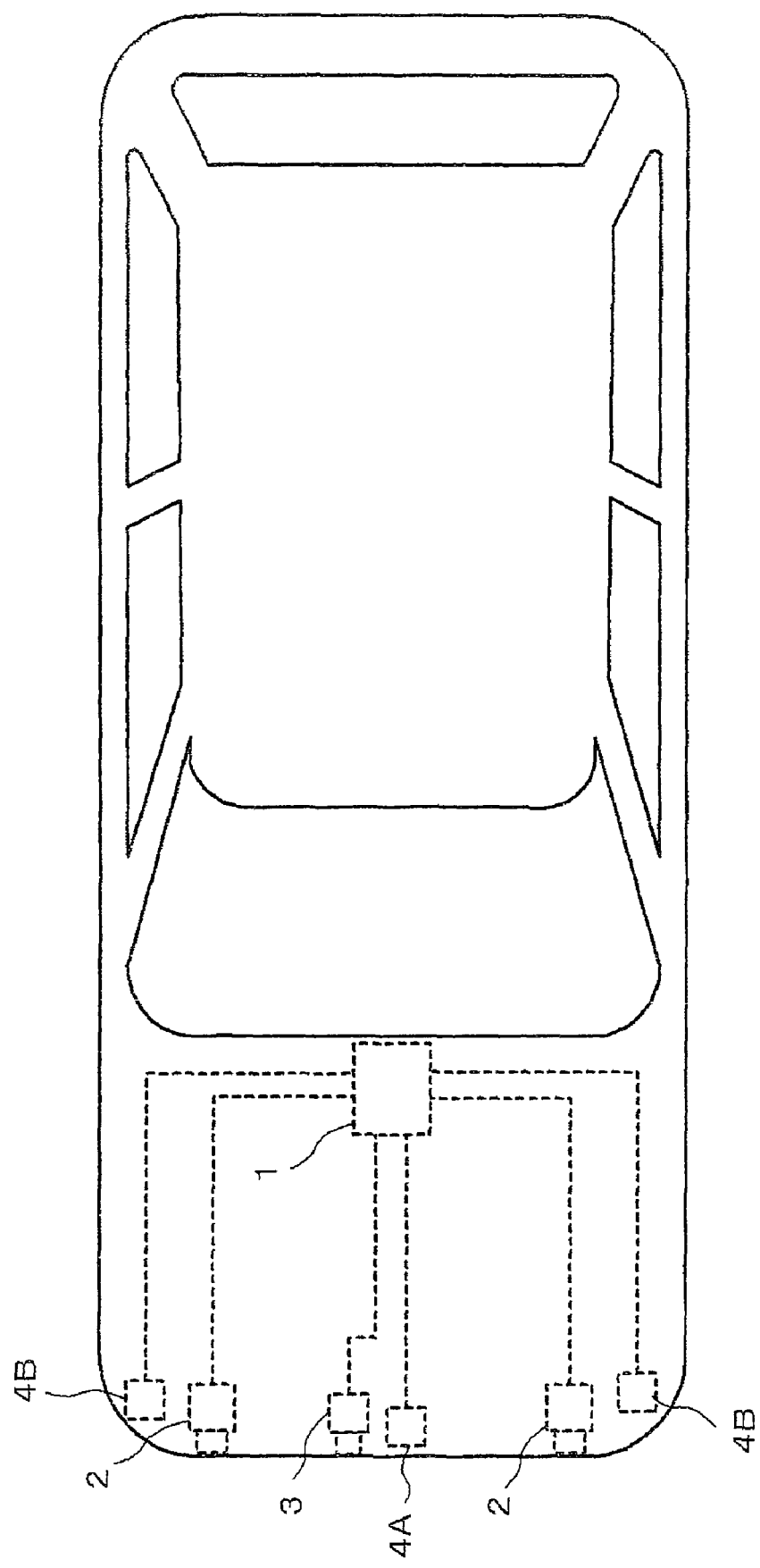
FIG. 2 is a plan view of the vehicle of FIG. 1.

FIG. 1 is a schematic view showing a configuration of an occupant restraint apparatus 20 according to an embodiment of the present invention. As shown in FIG. 1, the occupant restraint apparatus 20 consists of an airbag device 7, a control device 1, cameras 2, a distance measuring device 3, acceleration sensors 4, an occupant camera 6A, a seating sensor 6B, a seat position sensor 6C, and a belt sensor 6D. FIG. 2 is a plan view of the vehicle of FIG. 1. As shown in FIG. 2, the cameras 2 are each disposed on the left and right of the vehicle. The acceleration sensors 4 are each disposed on the left, center, and right of the front of the vehicle. Although not shown, a speed sensor and a steering angle sensor are connected to the control device 1; whereby a vehicle speed and a steering angle are transmitted to the control device 1. In addition, a yaw rate sensor, an inclination sensor and the like may be provided and connected to the control device 1.

The airbag device 7 includes an airbag formed of a bag-shaped base fabric and an inflator, and when the vehicle comes into collision, the airbag is inflated by gas supplied from the inflator, expands in front of the occupant, and restrains the occupant. The airbag has an opening for discharging the inner gas appropriately when the airbag is pressurized through expansion.

The control device 1 initiates the expansion of the airbag device 7 based on a signal of the acceleration sensors 4. Furthermore, a manner of the expansion is adjusted by controlling members that restrict the opening and size of the airbag.

Each of the cameras 2 converts an image formed through its lens into an electrical signal by means of, for example, a CCD (Charge coupled device) and outputs the image data that are digitized for every pixel. Each of the cameras 2 shoots an image in the direction in which the vehicle is travelling, and transmits it to the control device 1.

The distance measuring device 3, which is, for example, a millimeter-wave radar or the like, detects the distance to an object ahead of the vehicle, the azimuth angle of the object, and the speed of the object relative to the vehicle, and transmits them to the control device 1. In the case when the speed is not detected by a distance measuring device 3, a relative speed may be calculated from changes in the distance to the object in the control device 1. As a sensor for detecting the distance to the object without contact, a laser distance meter, an ultrasonic distance meter or the like may be employed.

The acceleration sensors 4 each detects an impact force applied to the vehicle when the vehicle comes into collision with an object. The acceleration sensors 4 includes an acceleration sensor 4A (also called a G-sensor 4A) disposed in the center of the vehicle and acceleration sensors 4B (also called satellite sensors 4B) disposed in both sides of the front of the vehicle. The G-sensor 4A and satellite sensors 4B each transmit detected acceleration to the control device 1. The control device 1 discriminates a collision type based on wave patterns of the signals from the G-sensor 4A and satellite sensors 4B.

The occupant camera 6A converts an image formed through its lens into electrical signals by means of, for example, a CCD (Charge coupled device) and outputs the image data that are digitized for every pixel. The occupant camera 6A obtains a graduated image of the upper-body of the occupant. The control device 1 detects the outline, size and seatbelt of the occupant from the image of the occupant camera 6A, and judges the physical constitution and posture of the occupant and whether or not the seatbelt is worn.

The seating sensor 6B, which is, for example, a pressure sensor, detects the weight of an occupant and transmits it to the control device 1. Likewise, a plurality of sensors disposed on a seating surface may detect a pressure pattern. In that case, the control device 1 can calculate a seating position from the pressure pattern. An electrostatic sensor may be used concurrently as one of seating sensors 6B. Since the electrostatic sensor changes its electrostatic capacity in response to an approaching human body, when the seating surface is pressurized, it can be distinguished whether a normal occupant is seated or any other object such as, for example, a child seat is placed.

The seat position sensor 6C detects the fore-and-aft position of the seat. The control device 1 estimates the physical constitution of an occupant from the fore-and-aft position of the seat. The seat position sensor 6C may be provided with a sensor for detecting the up-and-down position of the seat and/or the angle of the seat back.

The belt sensor 6D detects a withdrawn amount of a seatbelt. The control device 1 judges whether or not an occupant wears the seatbelt from the withdrawn amount. In addition, it is possible to estimate the physical constitution of the occupant from the withdrawn amount. It may also be detected whether or not the seatbelt is worn by means of a switch or the like, the switch being attached to the buckle of the seatbelt. For example, a buckle switch is switched on when the tang of the seatbelt is inserted into the buckle.

The occupant camera 6A, seating sensor 6B, seat position sensor 6C, belt sensor 6D and the like are sensors for detecting the status of an occupant, and are collectively called occupant status sensors 6. The occupant camera 6A, seating sensor 6B, seat position sensor 6C, belt sensor 6D and the like are not absolutely necessary as the occupant status sensors 6. They may be selectively used as appropriate. For example, it may be allowed to estimate the physical constitution of the occupant and detect whether or not the seatbelt is worn using the seat position sensor 6C and belt sensor 6D.

All the instruments connected to the control device 1 are not absolutely compulsory, but they may be used in different combination. For example, it may be allowed to detect an object and the distance thereto using the two cameras 2 without using the distance measuring device 3. Likewise, it can be allowed to detect the object, the distance thereto and its relative speed using one of the cameras 2 and the distance measuring device 3. More simply, it may be allowed to detect an object in the direction in which the vehicle is travelling, the distance to the object and its relative speed only using the distance measuring device 3.

Figure 3:
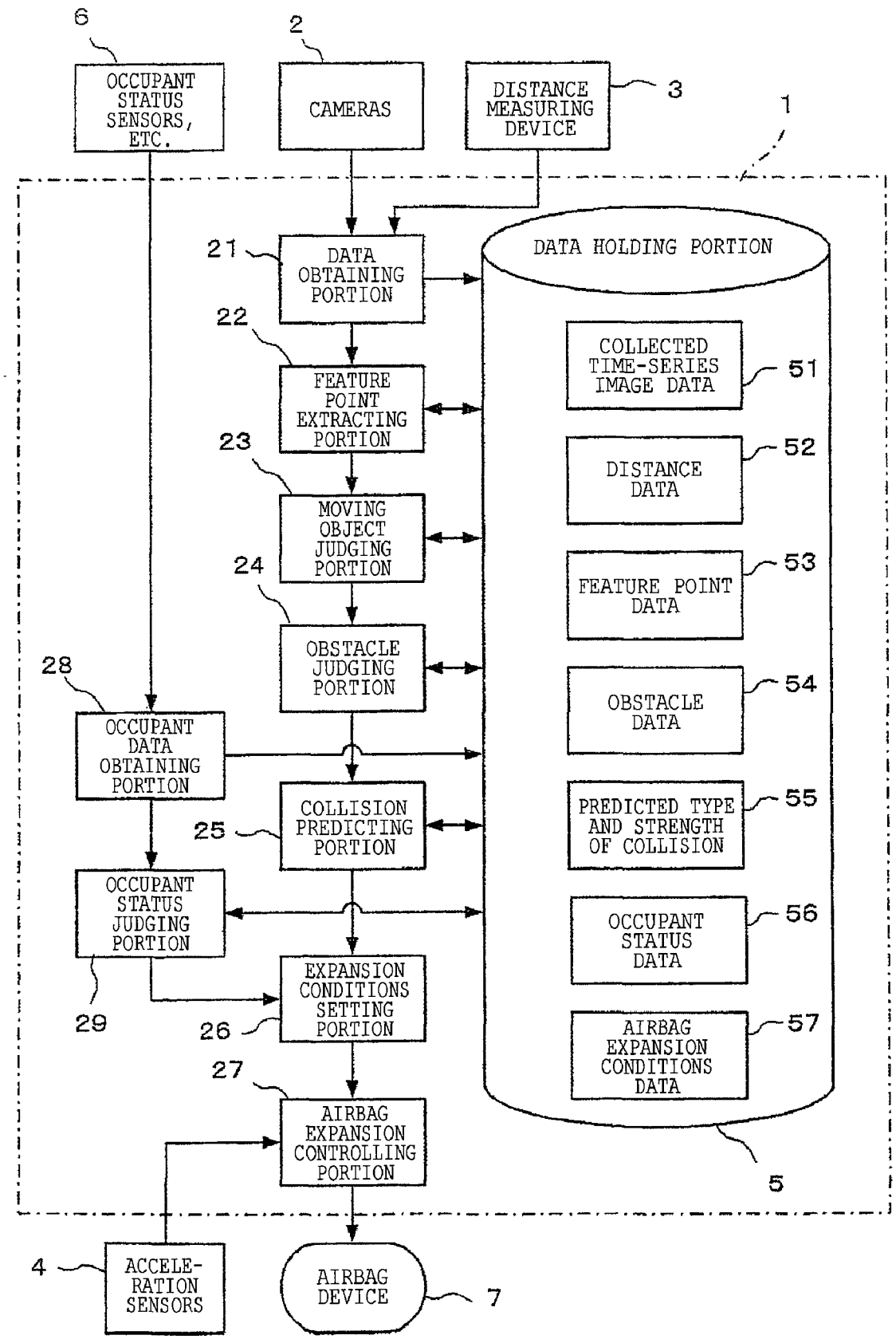
FIG. 3 is a block diagram showing a logical configuration of an occupant restraint apparatus according to an embodiment of the present invention.

FIG. 3 is a block diagram showing a logical configuration of an occupant restraint apparatus 20 according to an embodiment of the present invention. The occupant restraint apparatus 20 is configured from cameras 2, a distance measuring device 3, occupant status sensors 6 such as an occupant camera 6A and the like, a data obtaining portion 21, a feature point extracting portion 22, a moving object judging portion 23, an obstacle judging portion 24, a collision predicting portion 25, an occupant data obtaining portion 28, an occupant status judging portion 29, an expansion conditions setting portion 26, an airbag expansion controlling portion 27, a data holding portion 5, acceleration sensors 4, an airbag device 7 and the like. In the data holding portion 5, there are memorized and held image data 51, distance data 52, feature point data 53, obstacle data 54, predicted type and strength of collision 55, occupant status data 56, and airbag expansion conditions data 57.

Figure 4:
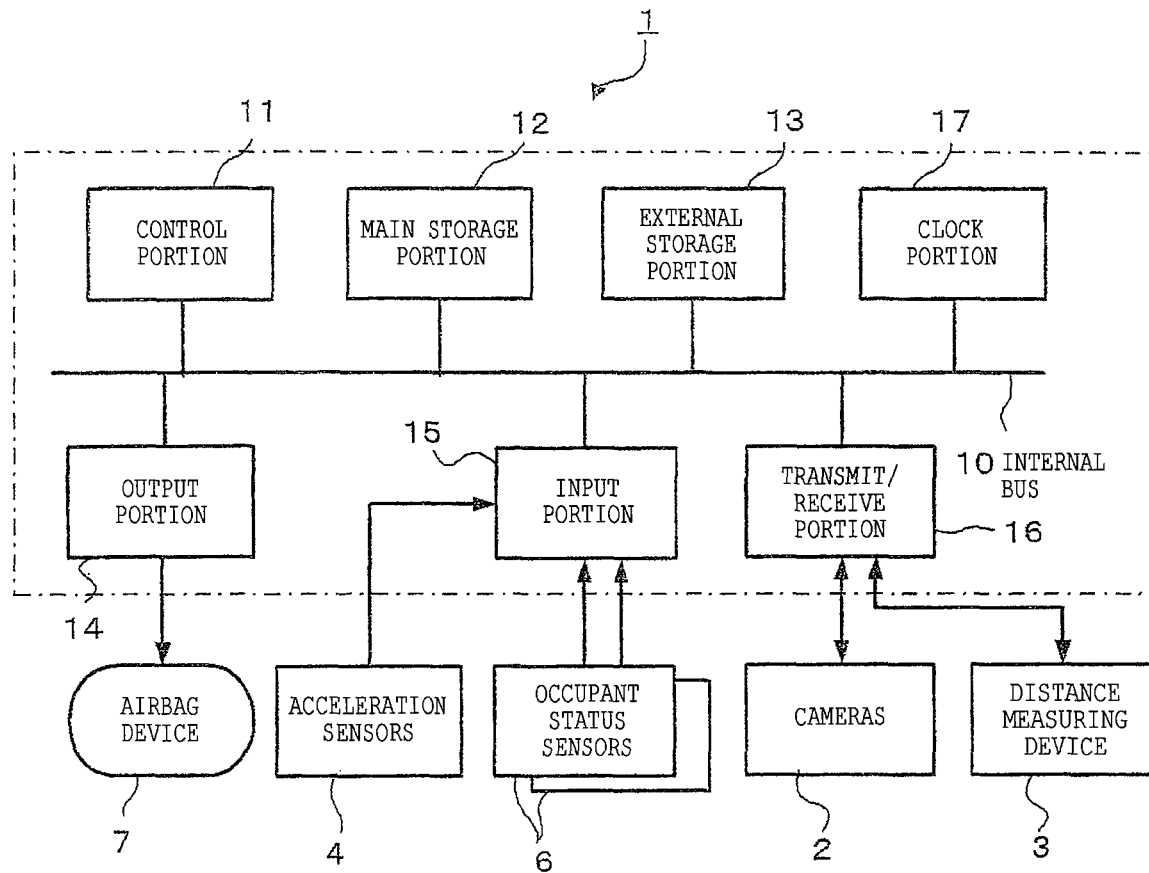
FIG. 4 is a block diagram showing an example of a physical configuration of a control device.

FIG. 4 is a block diagram showing an example of a physical configuration of the control device 1. The control device 1 shown in FIG. 3 is configured, as shown in FIG. 4 as hardware, a control portion 11, a main storage portion 12, an external storage portion 13, an output portion 14, an input portion 15, a transmit/receive portion 16, and a clock portion 17. The main storage portion 12, external storage portion 13, output portion 14, input portion 15, transmit/receive portion 16 and clock portion 17 are each connected to the control portion 11 through an internal bus 10.

The control portion 11 is composed of a CPU (Central Processing Unit) and the like, and executes respective processes in the data obtaining portion 21, feature point extracting portion 22, moving object judging portion 23, obstacle judging portion 24, collision predicting portion 25, occupant data obtaining portion 28, occupant status judging portion 29, expansion conditions setting portion 26, and airbag expansion controlling portion 27 in accordance with a program stored in the external storage portion 13. Respective processes in the data obtaining portion 21, feature point extracting portion 22, moving object judging portion 23, obstacle judging portion 24, collision predicting portion 25, occupant data obtaining portion 28, occupant status judging portion 29, expansion conditions setting portion 26 and airbag expansion controlling portion 27 are implemented by the control portion 11 through the program executed thereon.

The main storage portion 12 is composed of a RAM (Random-Access Memory) and the like, and is used as a workspace of the control portion 11. The data holding portion 5 is stored as a constitutional body of a memory location in a part of the main storage portion 12.

The external storage portion 13 is composed of a nonvolatile memory such as a flush memory, a hard disc, a DVD (Digital Versatile Disc), a DVD-RAM (Digital Versatile Disc Random-Access Memory), a DVD-RW (Digital Versatile Disc ReWritable) or the like, and stores in advance the program for allowing the control portion 11 to execute the above processes; it also supplies the program data to the control portion 11 according to an instruction therefrom and stores data supplied from the control portion 11. There is a case that, for example, image data 51 are stored in the external storage portion 13.

The output portion 14 is composed of a serial interface and the like, the serial interface being used for connection to an airbag device 7. The control portion 11 initiates the expansion of the airbag device 7 and controls an opening provided on the airbag device 7 and the size of expansion.

The input portion 15 is composed of a serial interface and the like, and inputs signals from acceleration sensors 4 and occupant status sensors 6. The signals of the acceleration sensors 4 and occupant status sensors 6 are transmitted to the control portion 11 through the input portion 15.

The transmit/receive portion 16 is composed of a modem or network terminal equipment and a serial interface or LAN (Local Area Network) connected therewith. The control portion 11 inputs time-series data from the cameras 2 or distance measuring device 3 through the transmit/receive portion 16.

As the clock portion 17, for example, a subtracting counter can be used that subtracts a counter value using a clock pulse and generates an interrupt output when the counter value becomes zero. If a certain value is set at the counter, it counts clock pulses of the set number and asserts an interrupt to the control portion 11; a certain time can thereby be measured.

The control portion 11 processes image data 51 obtained by the cameras 2, detects an object in the travelling direction of the vehicle, the object possibly coming into collision therewith, and discriminates a collision type based on the position, size, speed and the like of the detected object, by executing the program stored in the external storage portion 13. Then, the control portion 11 sets the conditions for expanding the airbag based on the collision type and controls the expansion of the airbag in accordance with the set conditions of expansion when a collision is detected by the acceleration sensors 4.

Getting back to FIG. 3, functions of respective portions of the occupant restraint apparatus 20 will now be described. The cameras 2 capture images in front of a vehicle. The data obtaining portion 21 inputs time-series image data 51 from the cameras 2 at a constant time interval and stores them as image data 51 at the data holding portion 5. The distance measuring device 3 detects an azimuth angle of and a distance to an object in front of the vehicle. The data obtaining portion 21 inputs the data of distance and azimuth from the distance measuring device 3 at a constant time interval and stores them as distance data 52 at the data holding portion 5.

The feature point extracting portion 22 extracts feature points from the time-series image data 51 to make a comparison between the images. For example, it calculates an edge of an image in which the concentration thereof changes, and extracts a flection point of the outline of the edge as a feature point. The feature point extracting portion 22 extracts feature points from the image data 51 and stores them as feature point data 53 at the data holding portion 5. The moving object judging portion 23 compares feature points between images and produces a vector connecting feature points, which show a strong correlation in patterns, as a motion vector. The moving object judging portion 23 groups the produced motion vectors for every object and judges the moving object.

Figure 5:
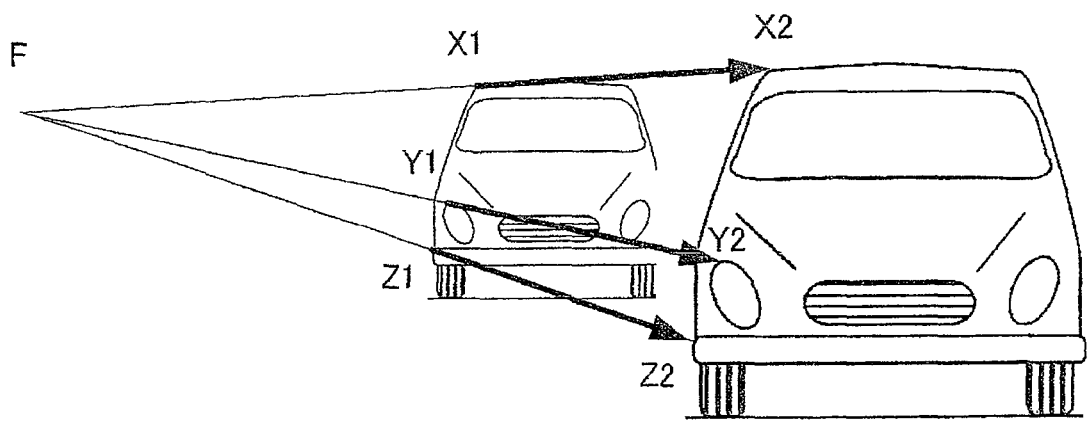
FIG. 5 is a view to explain grouping of motion vectors.

Now, the motion vector and a process for grouping them will be described. FIG. 5 is a view to explain the grouping of motion vectors. In FIG. 5, a scenario is shown schematically that a vehicle is getting near to a camera 2, the vehicle being a moving object. Feature points on the present image are denoted as X2, Y2 and Z2. Feature points on a past image corresponding to X2, Y2 and Z2 are denoted as X1, Y1 and Z1, respectively. When the feature points X1, Y1 and Z1 of the past image are displayed by overlaying on the present image, the respective vectors directed from X1, Y1 and Z1 to X2, Y2 and Z2 are called motion vectors.

In the case that images are perspective views, if motion vectors of feature points of the moving object, which moves in parallel with respect to a coordinate (camera coordinate) fixed to a camera (moves on a straight line in the camera coordinate), are extended, they intersect at one point on the images (see FIG. 5). The respective feature points give parallel straight lines with respect to the camera coordinate; therefore, the parallel lines intersect at one point when seen by a perspective drawing method. This point is called a vanishing point F (FOE: Focus Of Expansion). If different moving objects do not move in parallel each other, the motion vectors thereof intersect at different vanishing points.

That is, if the feature points X2, Y2 and Z2 of the present image, which are endpoints on one side of the motion vectors, are designated as external division points, the external division ratios of line segments linking each of the feature points X1, Y1 and Z1 of the past image (endpoints on the other side) and the vanishing point F are constant in the case of an object moving in parallel to itself. Therefore, it becomes possible to group such motion vectors that intersect at one vanishing point and have identical external division ratios described above as the motion vectors peculiar to one object. In regard to external division ratios other than the above ones, for example, if external division ratios are taken provided that the vanishing point F is the external division point, the external division ratios are also constant for the object moving in parallel to itself.

In the case that images are considered to be perspective views, on approximation that an object moves in parallel to itself between images which are close each other in time-series, motion vectors that can be grouped are designated as the feature points of one object. The moving object judging portion 23 stores the feature points of the motion vectors grouped for every object in the data holding portion 5 as a part of feature point data 53.

The moving object judging portion 23 correlates azimuth angles of distance data 52 and an object with each other and determines the distance and speed of the object. The distance to the object may also be calculated from the parallax between two cameras 2 and the distance between the cameras. The relative speed can be obtained from time-series image data 51 by calculating a change in distance. Furthermore, the relative acceleration of the object can be calculated from the difference in speed and the time difference.

If it is assumed that an object moves on the same plane as a vehicle, the distance to the object can be calculated on the basis that a feature point in the lowermost part of the object exists on the same plane (on a road surface). That is, the distance can be calculated using even one camera 2. There is a case, however, that an object may possibly come into collision is standing still and the feature point in the lowermost part does not always exist on a road surface, so a method using two cameras 2 or a distance measuring device 3 is more accurate.

It is allowed to discard an object that is positioned out of a vehicle travelling path and is standing still on the ground. That is, an object having the same speed as the vehicle in the opposite direction is regarded as a stationary object, and it is not necessary to detect the stationary object that does not exist in the vehicle travelling path. Even an object is standing still on the ground, any stationary object existing in the vehicle travelling path is detected, since it may possibly come into collision.

The obstacle judging portion 24 discriminates an object that may possibly come into collision with the vehicle. In images, time and space are assumed that are composed of a vehicle travelling path and the times when the vehicle passes respective points. First, the travelling direction of the vehicle is estimated from the speed, acceleration, steering angle, yaw rate, or the like. Then, a path of the vehicle, which is swept with the width and height of the vehicle, is assumed along the vehicle travelling line. For example, when the steering angle or yaw rate is zero, the vehicle is moving straight ahead, so time and space is assumed that are a column-shaped path extending forward of the vehicle and have the vehicle passing times calculated from its speeds at respective points. Likewise, in the case when the vehicle turns with a radius of curvature, a doughnut-shaped path having the radius is assumed.

If there is an object intersecting the time and space composed of a vehicle travelling path and the times when the vehicle passes respective points, the object including its time axis, the vehicle is determined to come into collision with the object. The obstacle judging portion 24 stores the position, size, relative speed and relative acceleration of an object, which is judged to have a possibility of collision, in the data holding portion 5 as obstacle data 54.

The collision predicting portion 25 predicts the type of collision between an obstacle and a vehicle, and the magnitude of impact. The collision types include, for example, a full-wrap frontal collision, an offset frontal collision, a diagonal collision, a pole frontal collision or a rollover. The magnitude of impact is predicted from the size and the relative speed (and the relative acceleration) of the obstacle.

A collision type is predicted, for example, as follows. When a collision occurs, if the center of an obstacle is on the center line of a vehicle, and the angle between the direction of an obstacle's relative speed and the orientation of the vehicle is within a certain threshold value, it is predicted to be a full-wrap frontal collision. Among the full-wrap frontal collisions, if the width of the obstacle is, for example, ⅕ or less of the width of the vehicle, it is predicted to be a pole frontal collision. When a collision occurs, if an obstacle is apart from the center line of the vehicle more than a given value, and the angle between the direction of the obstacle's relative speed and the orientation of the vehicle is within a certain threshold value, it is predicted to be an offset frontal collision.

When a collision occurs, if the angle between the direction of the obstacle's relative speed and the orientation of the vehicle exceeds a certain threshold value, it is predicted to be a diagonal collision. Among the diagonal collisions, if the height of the obstacle is equal to or less than a certain value, it is predicted to be a rollover.

It is difficult to predict accurately the magnitude of impact of a collision, since the mass and hardness of the obstacle are not known. When the obstacle is a moving object, however, it is possible to predict the magnitude of impact based on the size thereof on the supposition that the moving object is a vehicle. In addition, it may be allowed to predict the magnitude of impact by taking the relative acceleration into consideration. In the case of a moving object, it can be considered that the magnitude of impact is proportional to the square of relative speed and is also proportional to the size of the object. In the case that the obstacle is a stationary object, the magnitude of impact is predicted so as to become a maximum value by, for example, assuming that a steel frame or a concrete block is fixed on the ground.

The collision predicting portion 25 stores the predicted collision type and magnitude of impact in the data holding portion 5 as predicted type and strength of collision 55.

On the other hand, the occupant status sensors 6 such as an occupant camera 6A, a seating sensor 6B, a seat position sensor 6C, a belt sensor 6D and the like detect a graduated image of the upper-body of an occupant, the weight of the occupant, a pressure pattern, an approach of a human body, the fore-and-aft position of a seat, the withdrawn amount of a seatbelt and the like.

The occupant status judging portion 29 judges the status of an occupant from the data of the occupant status sensors 6, which have been input at the occupant data obtaining portion 28. For example, the physical constitution and posture of the occupant and whether or not the seatbelt is worn are judged by extracting the outline of the occupant and the seatbelt from the image of the occupant camera 6A. In addition, the positions of a head portion, a breast portion or shoulder portions of the occupant are detected from the image of the occupant.

The occupant status judging portion 29 calculates a seating position from a pressure pattern, and distinguishes whether an occupant is seated or any other object such as, for example, a child seat is placed from the data of an electrostatic sensor. It may be judged whether or not the occupant wears a seatbelt from the withdrawn amount of the seatbelt. In addition, it is possible to estimate the physical constitution of the occupant from the withdrawn amount. The occupant status judging portion 29 stores the judged status of the occupant in the data holding portion 5 as occupant status data 56.

The expansion conditions setting portion 26 sets conditions for expanding an airbag, based on predicted type and strength of collision 55 and occupant status data 56. The conditions for expanding an airbag include, for example, a threshold value of impact force that is a condition for initiating inflation and expansion of the airbag. Moreover, in the case that an opening of the airbag can be enlarged or reduced, they also include the timing of enlargement/reduction, i.e., the time from when the inflation and expansion of the airbag is initiated to when the opening is enlarged/reduced.

Figure 11:
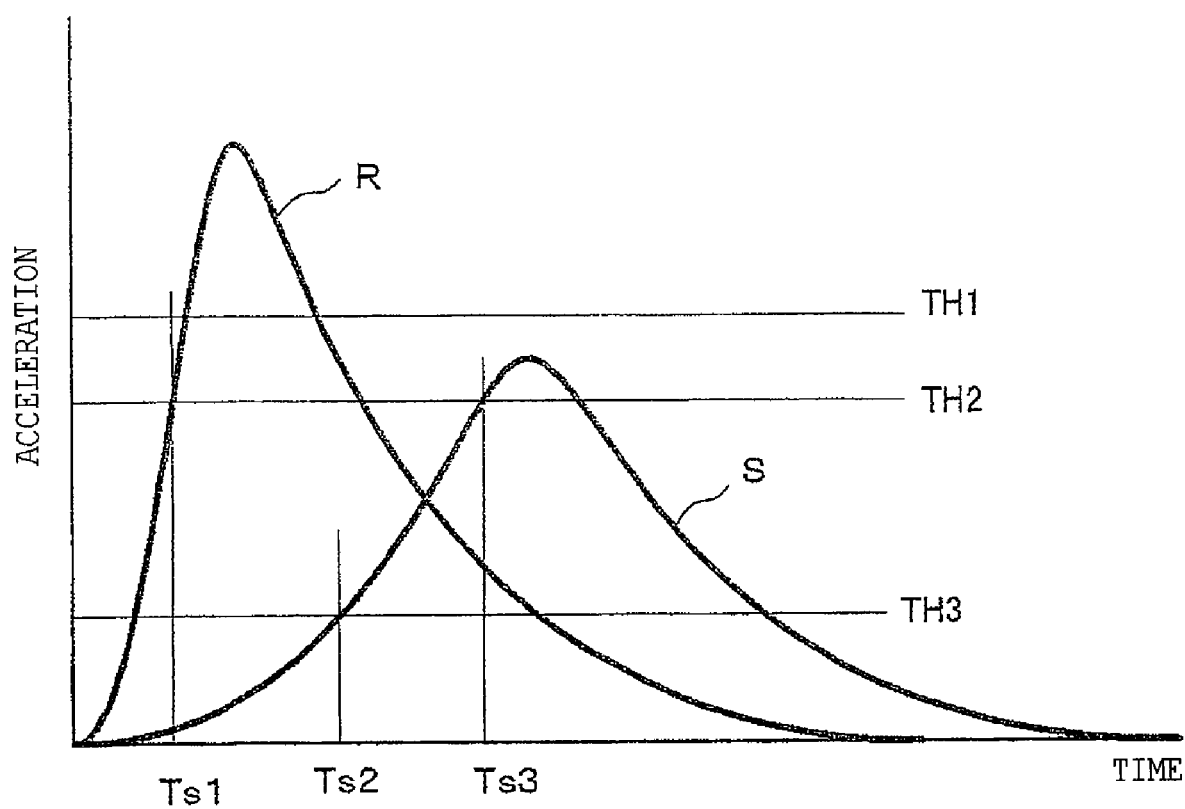
FIG. 11 is a graph schematically showing the change of impact forces at collision.

The inflation and expansion of the airbag is generally initiated when the impact force detected by acceleration sensors 4 exceeds a predetermined threshold value. The patterns of change in the impact force detected by the acceleration sensors 4 are different depending on the type of collision. FIG. 11 is a graph schematically showing the change of impact forces at collision. In the case of a full-wrap frontal collision R or a pole frontal collision, the acceleration detected by G-sensor sharply increases and the peak value is high.

Compared to that, in the case of such a diagonal collision, the acceleration detected by G-sensor gradually increases and the peak value is somewhat low. If the threshold value for initiating inflation and expansion of the airbag is maintained at an identical value, expansion of the airbag would delay in the case when a diagonal collision occurs. For example, if the threshold value is set at identical value TH2, the expansion of the airbag is initiated at time Ts1 when a full-wrap frontal collision R occurs; contrarily, the expansion is initiated after time Ts3 passes when a diagonal collision S occurs. Moreover, in the case of threshold value TH1, the acceleration at a diagonal collision S does not reach the threshold value TH1, so the airbag does not expand. For this reason, in the case when a diagonal collision is predicted, for example, the threshold value of impact force for initiating inflation and expansion is made small. When a diagonal collision is predicted, the time when the expansion begins is shortened to Ts2 by setting the threshold value to TH3.

There is a difference between the pattern of change in the impact force detected by G-sensor and that detected by satellite sensors depending on the type of collision. For example, in the case of a full-wrap frontal collision, the acceleration detected by the G-sensor and that detected by the satellite sensors both change in a similar tendency, but in the case of a pole frontal collision, the acceleration detected by the satellite sensors delays somewhat compared to that detected by the G-sensor and the peak value is low. In the case of a diagonal collision, the output of the satellite sensor on the collision side appears first, and the outputs of the G-sensor and the satellite sensor on the other side appear after a while with a low peak value, respectively.

A condition for initiating inflation and expansion of the airbag may be set at the timing when a value calculated from the outputs of G-sensor and satellite sensors exceeds a threshold value, so the acceleration calculating equation and the threshold value may be altered depending on collision types. For example, it is considered that the value from the G-sensor dominates in the case of a full-wrap frontal collision or a pole frontal collision, and the value from the satellite sensor on the collision side is weighed in the case of a diagonal collision. Depending on collision types, the impact force applied to an occupant varies according to the structure and strength of the vehicle. Therefore, the conditions for expanding an airbag are set to meet the type of vehicles.

In the case that a plurality of airbags are equipped for an occupant, the conditions for expanding the airbags may be altered depending on collision types. For example, if a vehicle is equipped with a curtain airbag or a side airbag, when a rollover is predicted, it becomes necessary to expand the curtain airbag early and to hold the pressure for a long time. On the other hand, the curtain airbag may be not so important in the case of a full-wrap frontal collision.

The expansion conditions setting portion 26 sets conditions for expanding an airbag in addition to the above. For example, in the case that an airbag is designed on the assumption that an occupant does not wear a seatbelt, it is necessary to reduce the restraining force of the airbag for the occupant who wears a seatbelt. When an occupant wears a seatbelt, it is possible to receive the nearby occupant softly by enlarging the opening of the airbag early and reducing the pressure thereof.

In the case when an occupant is physically big and the seating position of the occupant is apart from a steering wheel or dashboard, it is better to expand an airbag widely. Since a physically small occupant is close to the steering wheel, it is not necessary to expand the airbag widely. Furthermore, the expansion size of the airbag and the gas discharging speed are regulated according to the position of the head portion, breast portion or shoulder portions of the occupant.

Figure 6A:
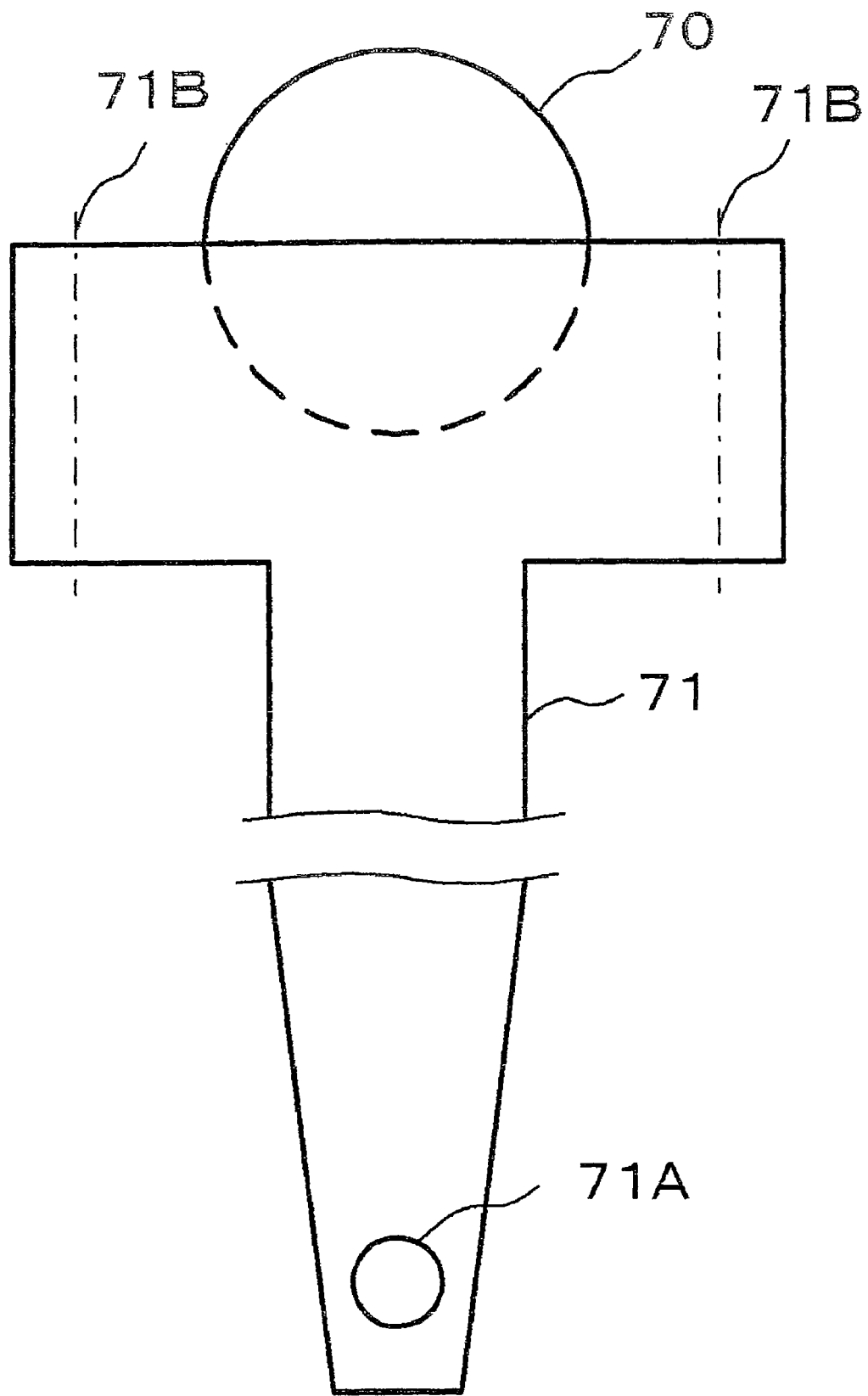
FIG. 6A is a view showing an example of a mechanism for changing the area of an opening.
Figure 6B:
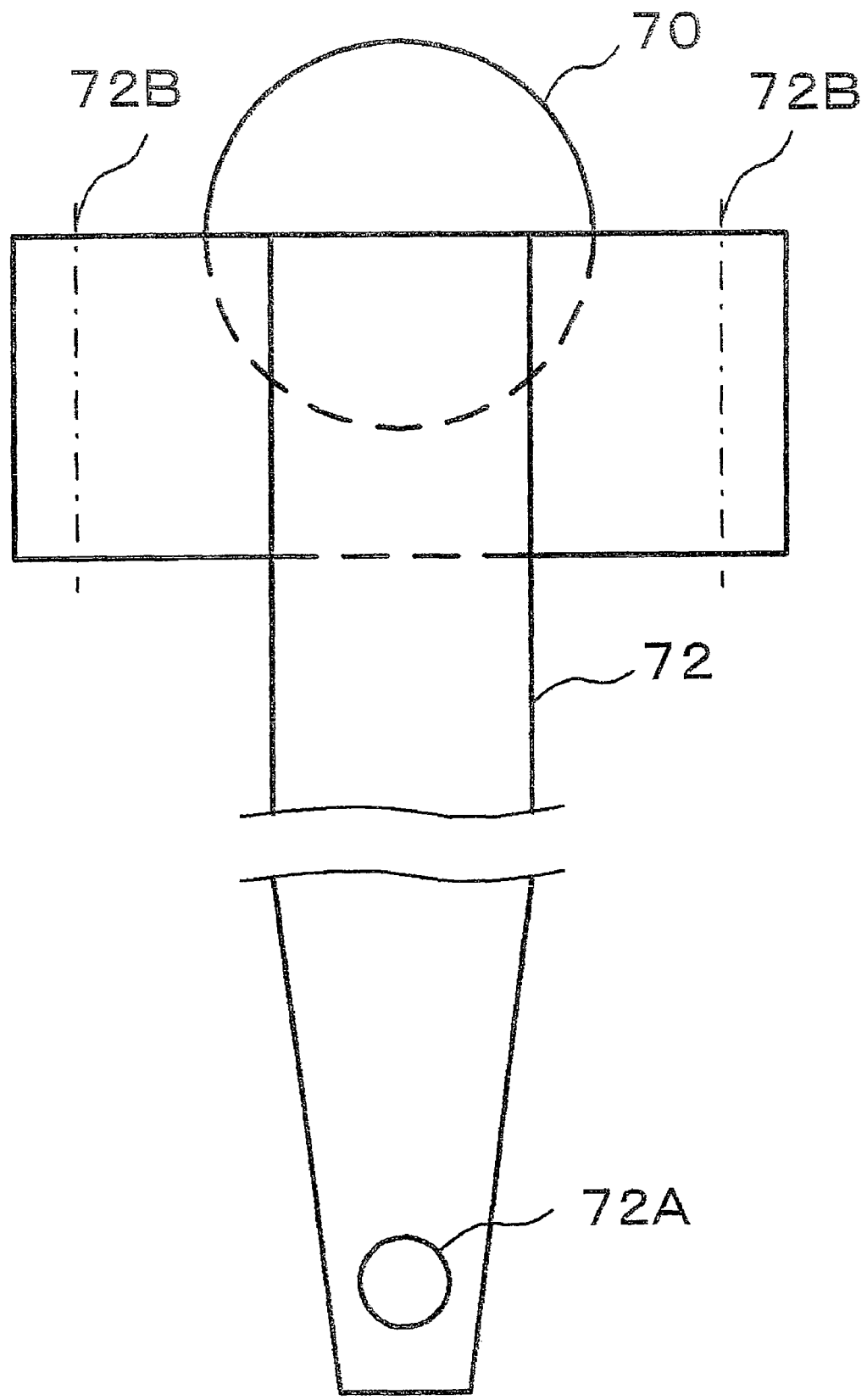
FIG. 6B is a view showing an example of a mechanism for changing the area of an opening.

FIGS. 6A and 6B show examples of the mechanism for changing the area of an opening. FIGS. 6A and 6B are views of the opening portion of an airbag seen from the inside thereof. As shown in FIG. 6A, a T-shaped flap 71 is attached to an airbag by sewing the left and right edge portions of the T-shape (dot-and-dash line 71B) so as to cover the opening of the airbag partially. Fixing holes 71A and 72A are each formed at the tip portion of the flaps 71 and 72. The fixing holes 71A and 72A are each fixed to a cap of an igniter, which is described later. FIGS. 6A and 6B show a state that the fixing holes 71A and 72A are not fixed to the cap of the igniter. In this state, since the openings 70 are partially covered by the flaps 71 and 72, respectively, the effective area of each of the openings 70 is small. When the fixing holes 71A and 72A are each attached to the cap of the igniter, the flaps 71 and 72 are pulled in a downward direction in FIGS. 6A and 6B, respectively; then the upper part of the T-shape becomes deformed, which causes the opening 70 to be fully exposed and the effective area of the opening 70 to be enlarged.

FIG. 6B shows a different configuration of the flap. The flap 71 shown in FIG. 6A has a configuration such that the lateral bar portion of the T-shape is pulled from the underside thereof toward the fixing-hole direction. The flap 72 shown in FIG. 6B has a configuration such that the upper end of lateral bar portion of the T-shape is pulled toward the fixing-hole direction. The lateral bar portion of each of the flaps 71 and 72 has an elasticity and is woven so as to deform in an up and down direction on the drawing. In the flap 71 formed of one piece of cloth, the vertical stem portion of the T-shape also deforms and pulls the lateral bar portion from the underside thereof, so the lateral bar portion extends in a vertical direction. On the other hand, in the configuration of FIG. 6B, since the top of the lateral bar portion is directly pulled, the lateral bar portion is effectively deformed, by which the opening is easily expanded.

FIG. 7 shows an example of a different flap. FIG. 7(a) shows a state that a fixing hole 73A is fixed to a cap of an igniter. FIG. 7(b) shows a state that the fixing hole 73A is off the cap. On the flap 73, a small vent 73D and a large vent 73C are formed. The top edge 73B of the flap 73 is fixed to an airbag, and the small vent 73D overlaps an opening 70 in the state that the fixing hole 73A is off the cap. In the state that the fixing hole 73A is fixed to the cap of the igniter, the large vent 73C overlaps the opening 70. Since the top edge 73B of the flap 73 is fixed to the airbag, the expansion of the airbag is restricted by the flap 73.

Figure 8A:
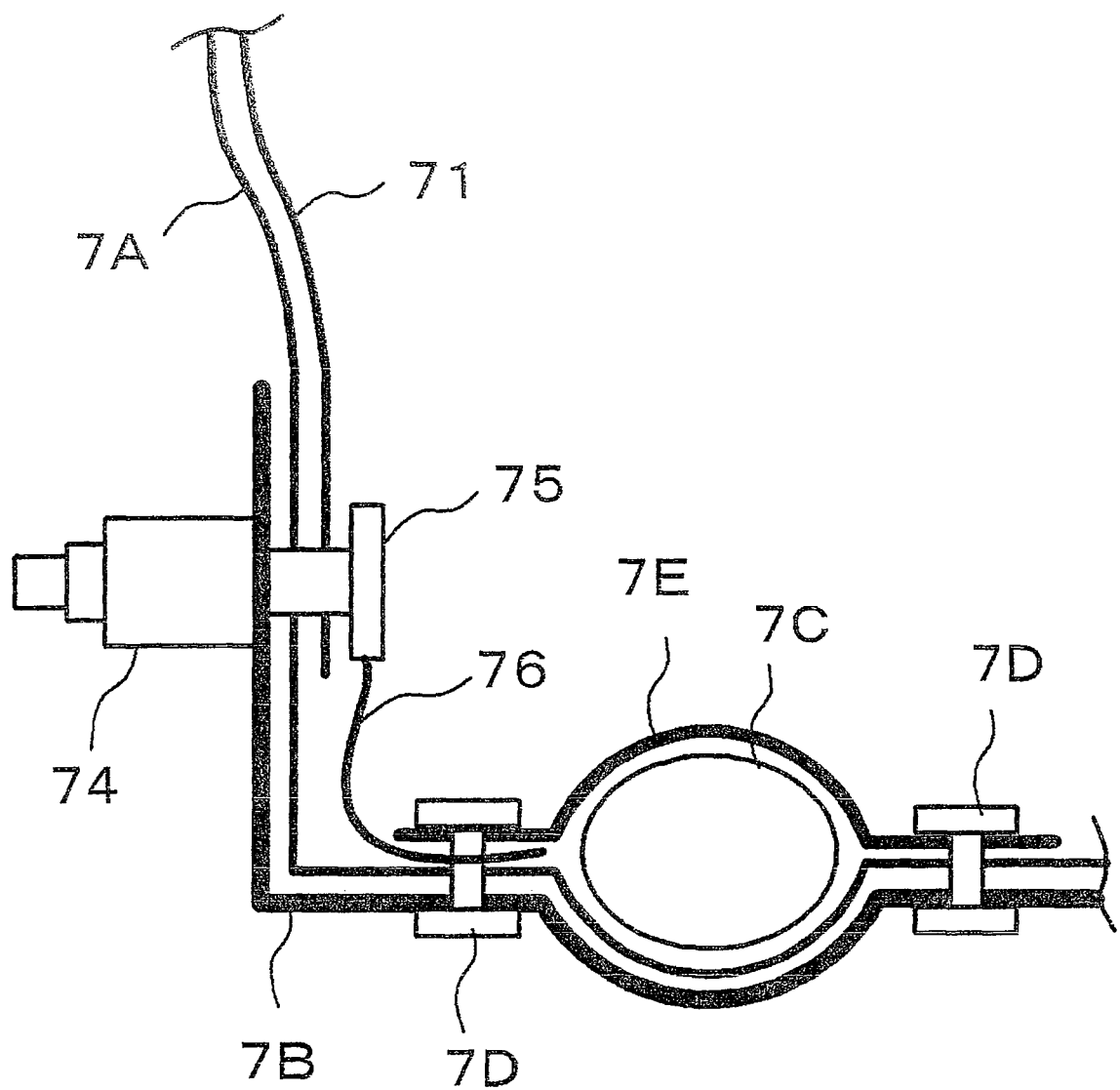
FIG. 8A is a partial cross-section view of an airbag device.
Figure 8B:
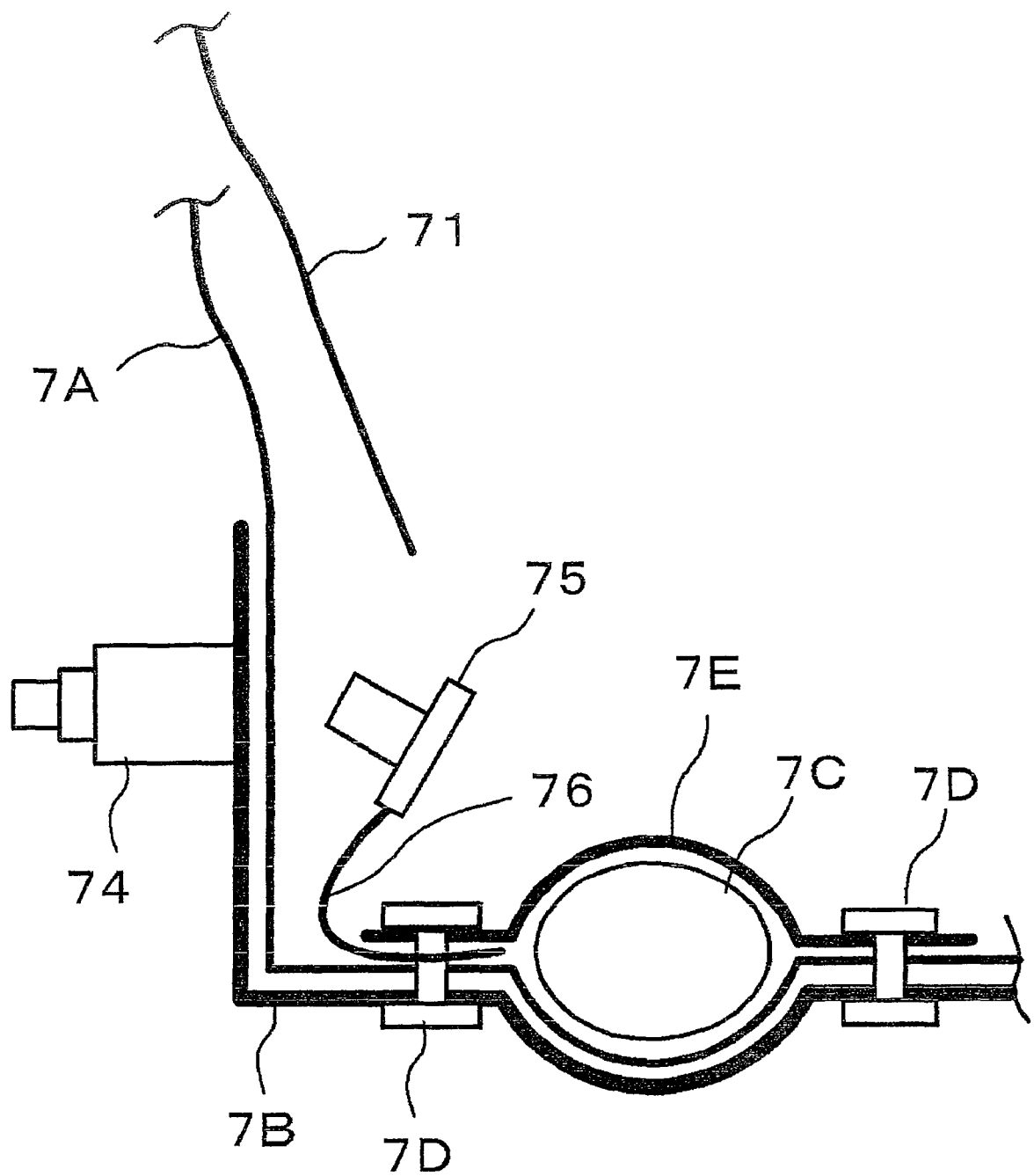
FIG. 8B is a partial cross-section view of an airbag device.

FIGS. 8A and 8B are partial cross-section views of the airbag device 7. An airbag 7A and an inflator securing member 7E are fixed to a casing 7B of the airbag device 7 using fixing members 7D. While the airbag 7A is accommodated in folded state in the casing 7B, a state that the airbag 7A is expanded is shown in FIGS. 8A and 8B. In the casing 7B, an igniter 74 is fixed. To the igniter 74, a cap 75 is attached on the inside of the airbag 7A. The cap 75 passes through a fixing hole 71A of a flap 71 and the airbag 7A, and is fixed to the igniter 74. The cap 75 is secured to the fixing member 7D with an anchor strap 76 so as to not leap in the airbag 7A.

FIG. 8A shows a state that the fixing hole 71A of the flap 71 is fixed to the cap 75 of the igniter 74. FIG. 8B shows a state that the flap 71 is off the cap 75. The igniter 74 is connected to the control device 1 and is activated by a command from the control device 1. When the igniter 74 is activated, the cap 75 comes off from the igniter 74 and the flap 71 is released. The same thing happens also in the cases of the flap 72 and flap 73.

Figure 9A:
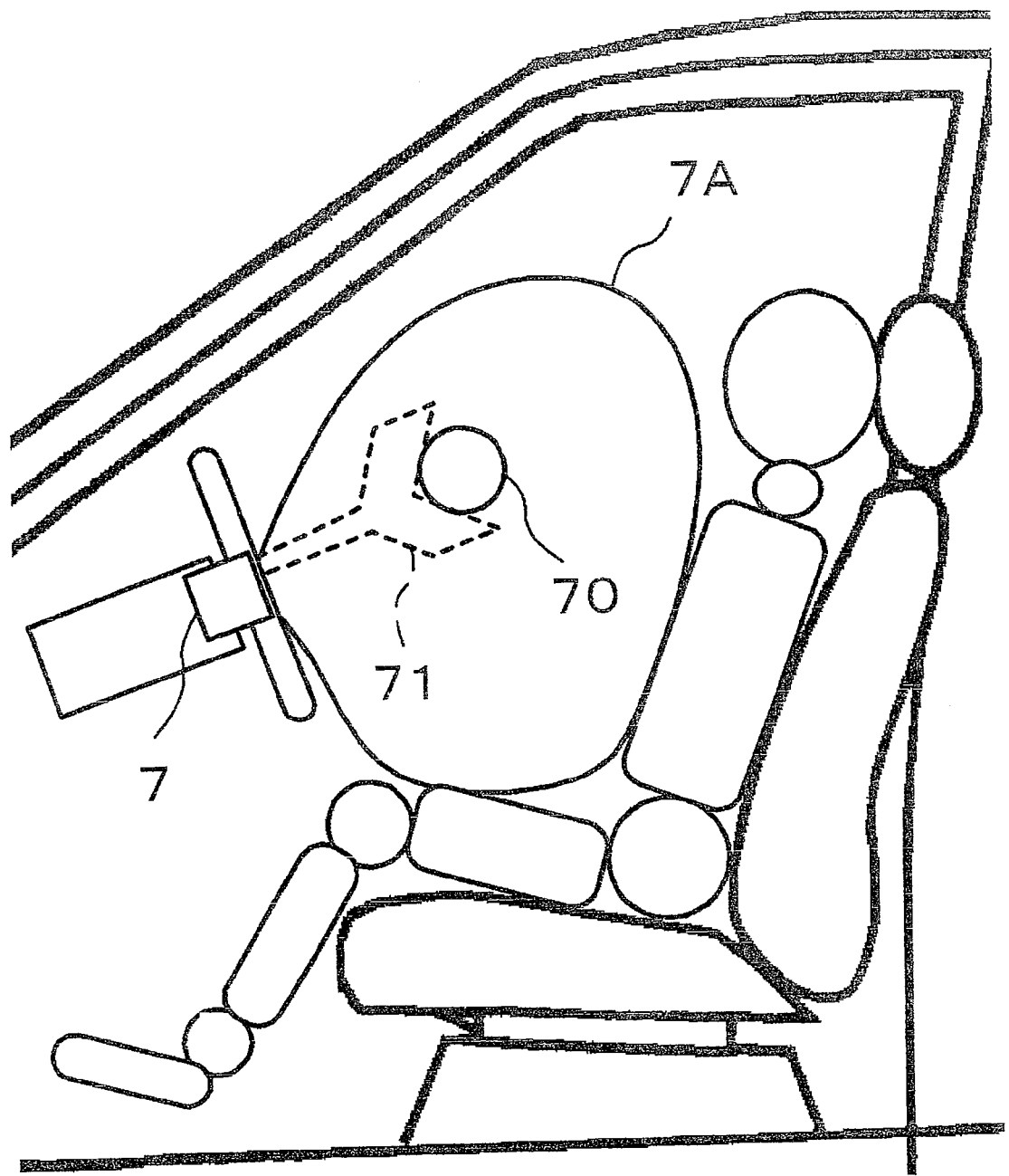
FIG. 9A is a view to explain a function of the flap of FIG. 6A.
Figure 9B:
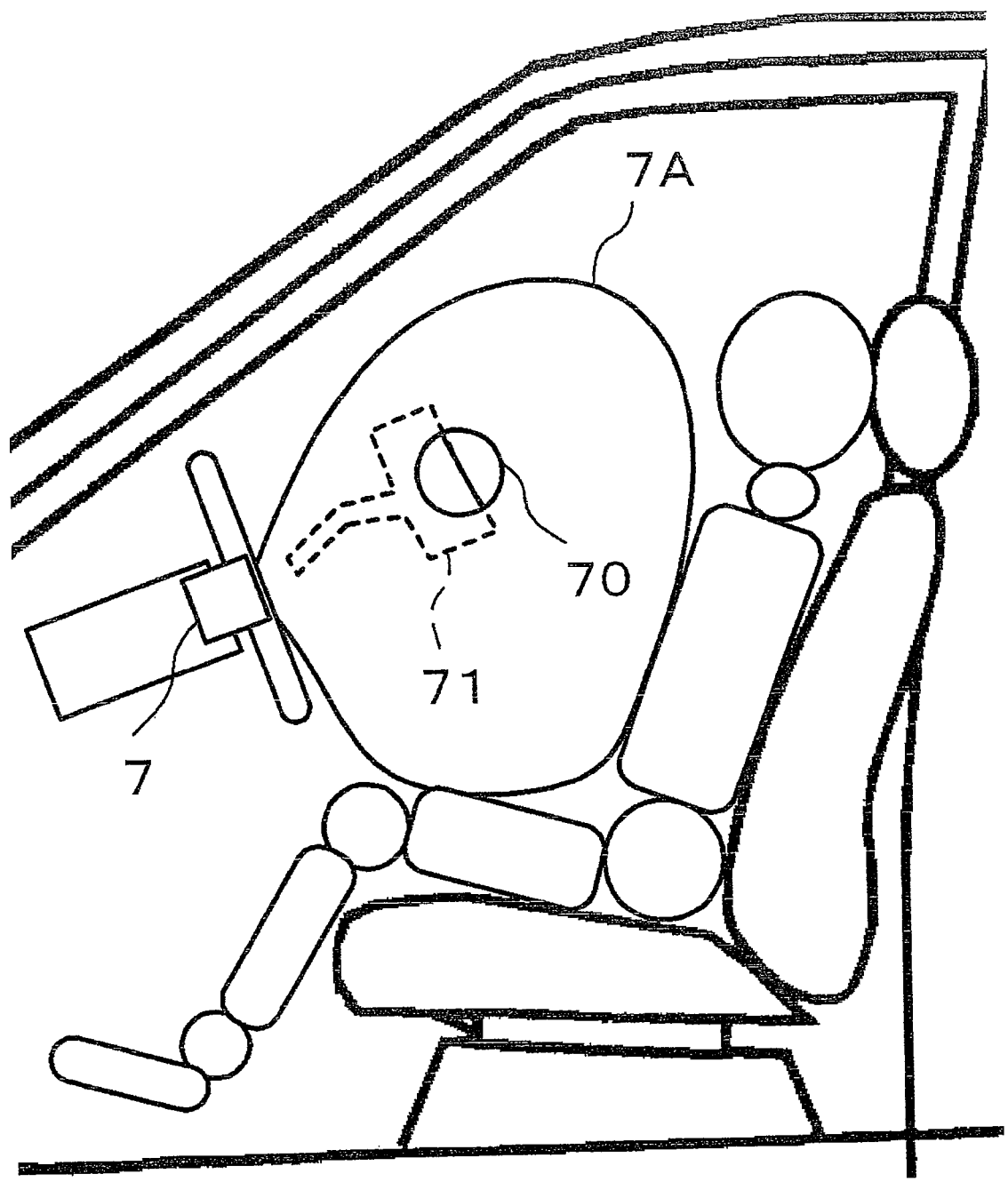
FIG. 9B is a view to explain a function of the flap of FIG. 6A.

FIGS. 9A and 9B are views for explaining actions of the flap 71. FIG. 9A shows a state that the flap 71 is secured. FIG. 9B shows a state that the flap 71 is released. As shown in FIG. 9A, if the flap 71 is still secured to the igniter 74 when the airbag 7A is expanded, the vertical stem of the T-shape shown in FIG. 6A is pulled, which causes the T-shape to become a Y-shape and the opening 70 to open widely.

If the igniter 74 is activated, the cap 75 comes off and the flap 71 is released; then as shown in FIG. 9B, the flap 71 is restored to the T-shape and blocks a part of the opening 70. As a result, the effective area of the opening 70 is reduced, and the discharge speed of the gas in the airbag 70 becomes small. For example, in the case that an occupant does not wear a seatbelt, the opening 70 is made small by releasing the flap 71, by which the outflow of the gas from the airbag 7A becomes small and the force for restraining the occupant is made strengthened.

Figure 10A:
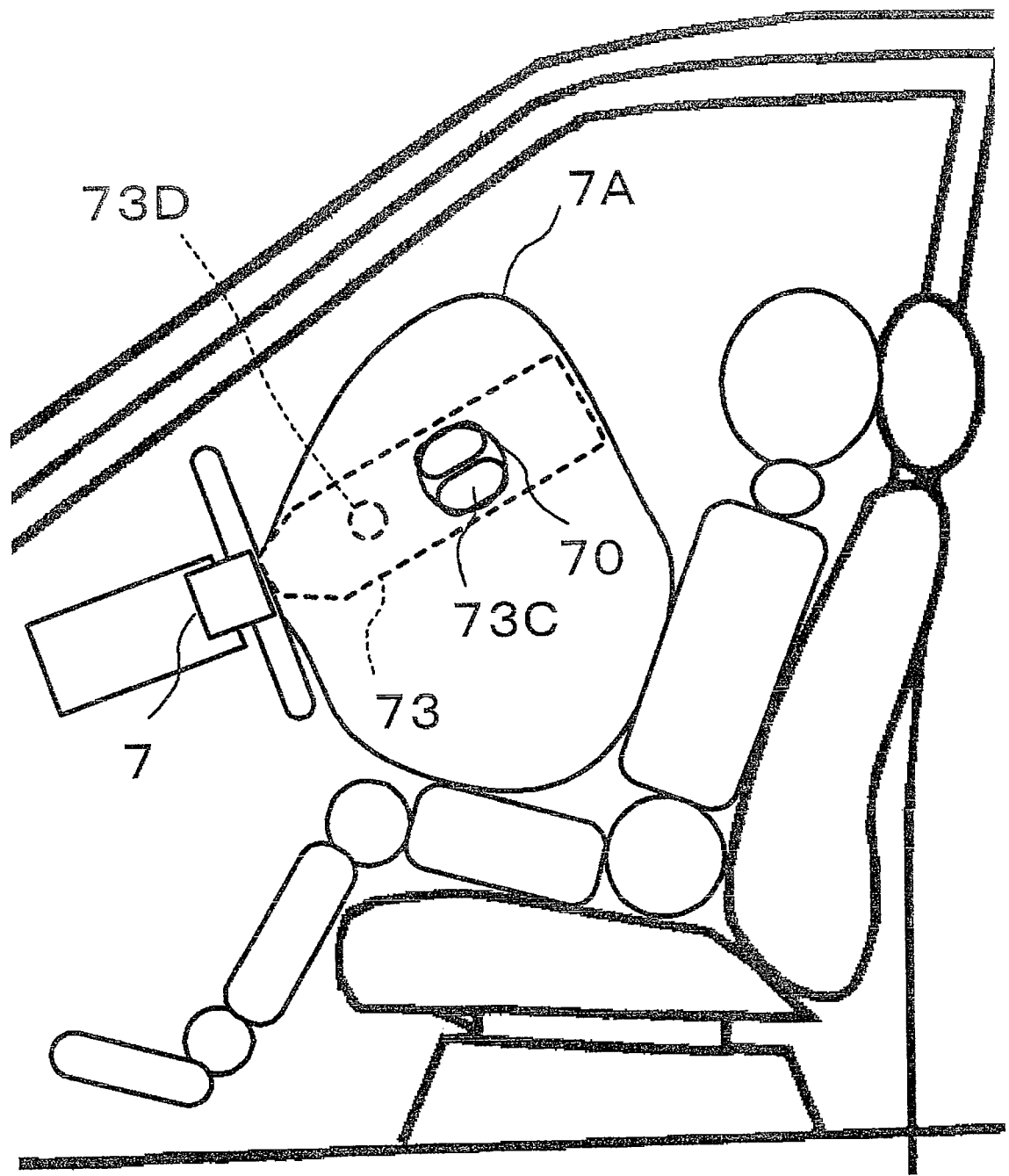
FIG. 10A is a view to explain a function of the flap of FIGS. 7(a) and 7(b).
Figure 10B:
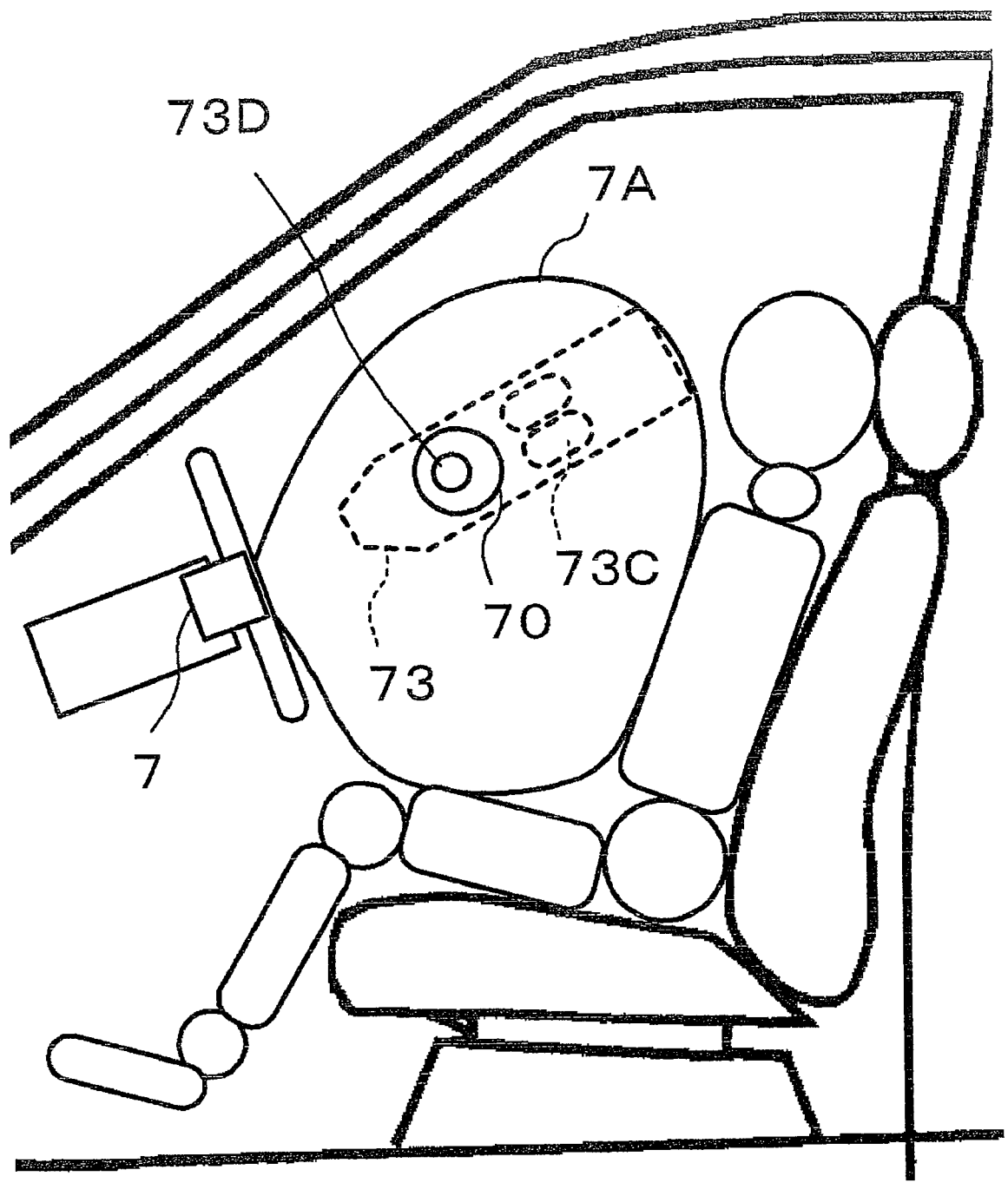
FIG. 10B is a view to explain a function of the flap of FIGS. 7(a) and 7(b).

FIGS. 10A and 10B are views for explaining actions of the flap 73 of FIG. 7. FIG. 10A shows a state that the flap 73 is secured, and FIG. 10B shows a state that the flap 73 is released. As shown in FIG. 10A, if the flap 73 is still secured to the igniter 74 when the airbag 7A is expanded, the large vent overlaps the opening 70 and the effective area of the opening 70 is large. In addition, the airbag 7A expands minimally due to being restricted by the flap 73.

If the igniter 74 is activated, the cap 75 comes off, and the flap 73 is released, the airbag 7A is not restricted by the flap 73 and expands widely. In addition, the flap 73 moves in response to the expansion of the airbag 7A, and the small vent overlaps the opening 70. As a result, the effective area of the opening 70 is reduced, and the discharge speed of the gas in the airbag 70 becomes small.

For example, in the case that an occupant is physically small and wears a seatbelt, the flap 73 is remained fixed, the expansion of the airbag 7A is restricted, and the opening 70 is made large, by which the outflow of the gas becomes large. As a result, the occupant is received softly by the airbag 7A. In the case that an occupant is physically big and does not wear a seatbelt, the flap 73 is released, the restriction of airbag expansion is lifted, and the opening 70 is made small, by which the outflow of the gas from the airbag 7A becomes small; the restraining force applied to the occupant is thereby strengthened.

The function of the occupant restraint apparatus 20 will be described again with reference to FIG. 3. The expansion conditions setting portion 26 stores conditions for expanding an airbag in the data holding portion 5 as the airbag expansion conditions data 57, the conditions for expanding an airbag being set based on the predicted type and strength of collision 55 and the occupant status data 56. The airbag expansion controlling portion 27 inputs impact acceleration from the acceleration sensors 4, and activates the airbag device 7 and controls expansion of the airbag 7A.

Next, the process of the occupant restraint apparatus 20 will be described. Incidentally, the control portion 11 executes the process of the occupant restraint apparatus 20 by cooperating with the main storage portion 12, external storage portion 13, output portion 14, input portion 15, transmit/receive portion 16, and clock portion 17, as described above.

Figure 12:
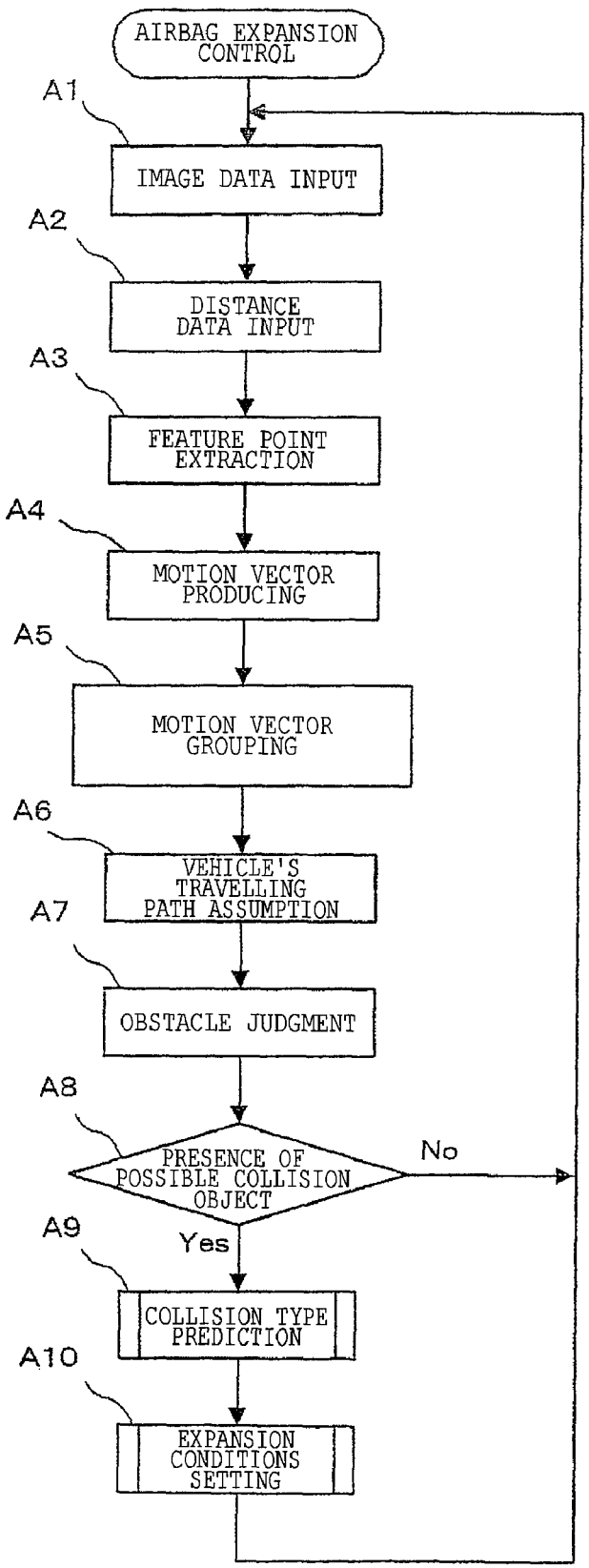
FIG. 12 is a flowchart showing an example of the process of airbag expansion control.

FIG. 12 is a flowchart showing an example of the process of airbag expansion control. The control portion 11 inputs time-series images from the cameras 2 via the transmit/receive portion 16 (Step A1), and also inputs distance data 52 from the distance measuring device 3 via the transmit/receive portion 16 (Step A2).

The control portion 11 extracts feature points from the image data 51 (Step A3), and as described above, produces motion vectors from the time-series images (Step A4). Then, the control portion 11 groups the motion vectors, which intersect at one vanishing point and have identical external division ratios, as the feature points of one object (Step A5).

Next, the control portion 11 assumes a vehicle travelling path from the speed, acceleration and steering angle or yaw rate of the vehicle (Step A6), and then judges an object, which intersects at the time and space of the vehicle travelling path, as an obstacle (Step A7). If any possible collision object is not found as a result of judging the obstacle (Step A8; No), the same process is repeated by returning to the image data input (Step 1).

If a possible collision object is found (Step A8; Yes), the process of collision type prediction (Step A9) is executed and the conditions for expanding the airbag 7A are set (Step A10).

Figure 13:
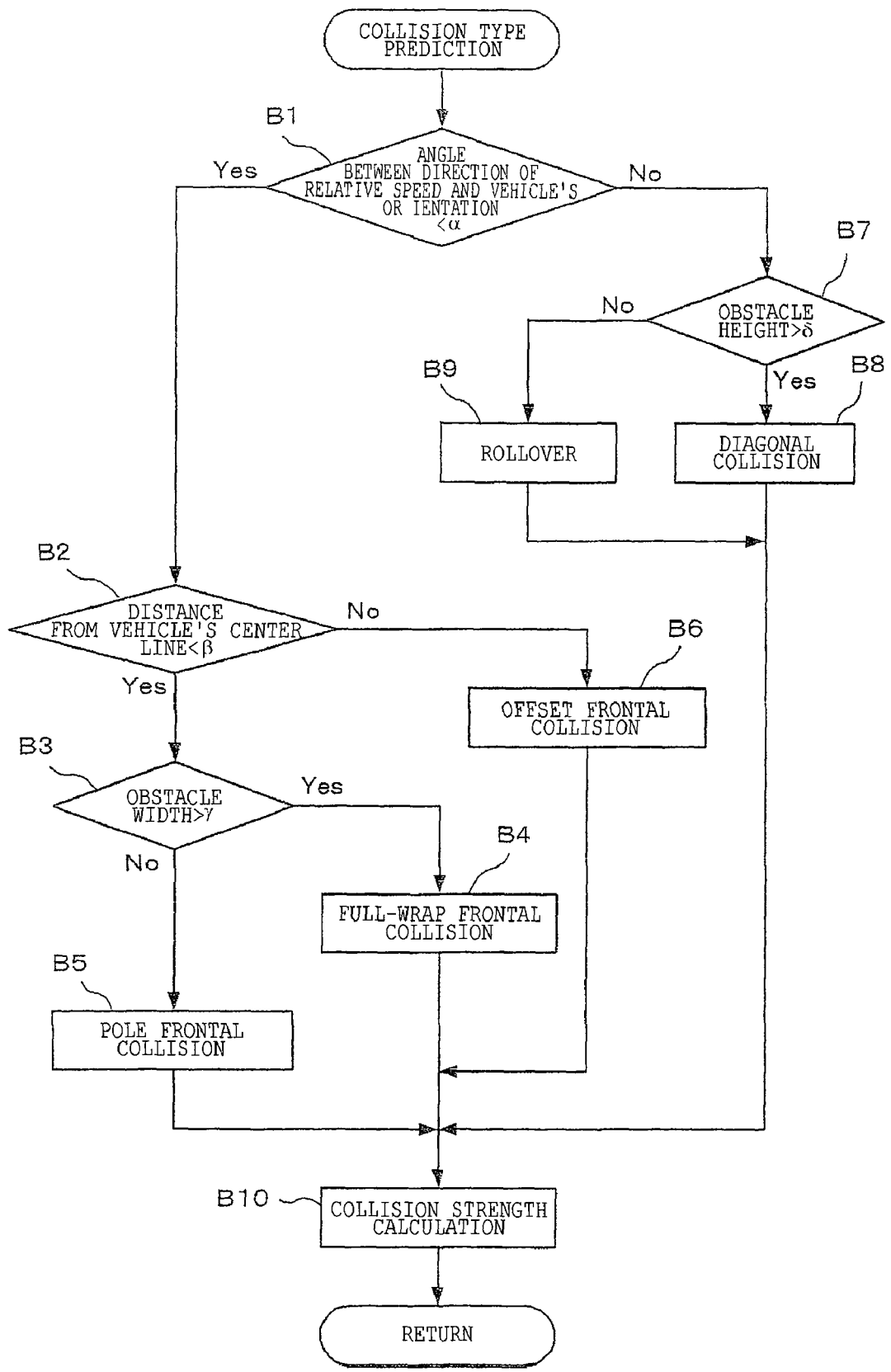
FIG. 13 is a flowchart showing an example of the process of collision type prediction.

FIG. 13 is a flowchart showing an example of the process of collision type prediction of Step A9. The control portion 11 compares the angle between the direction of an obstacle's relative speed and the orientation of a vehicle with a threshold value with reference to obstacle data 54 (Step B1). If the angle is smaller than a threshold value $\alpha$ (Step B1; Yes), the distance from the vehicle's center line to the object (distance from vehicle's center line) is compared with a threshold value $\beta$ (Step B2). If the distance from vehicle's center line is smaller than the threshold value $\beta$ (Step B2; Yes), it is further judged whether or not the width of the obstacle is larger than a given value $\gamma$ (Step B3). If the obstacle width is larger than the given value $\gamma$ (Step B3; Yes), the collision type is judged to be a full-wrap frontal collision (Step B4).

If the obstacle width is smaller than the given value $\gamma$ (Step B3; No), the collision type is judged to be a pole frontal collision (Step B5). Returning to Step B2, if the distance from vehicle's center line is larger than the threshold value $\beta$ (Step B2; No), the collision type is judged to be an offset frontal collision (Step B6).

Returning to Step B1, if the angle between the direction of the obstacle's relative speed and the orientation of the vehicle is larger than the threshold value $\alpha$ (Step B1; No), it is judged whether or not the height of the obstacle is larger than a given value $\delta$ (Step B7). If the obstacle height is smaller than the given value $\delta$ (Step B7; No), the collision type is judged to be a rollover (Step B9). If the obstacle height is larger than the given value 6 (Step B7; Yes), the collision type is judged to be a diagonal collision (Step B8).

After the collision type is thus judged, a magnitude of the collision strength is assumed from the size, relative speed and relative acceleration of the obstacle (Step B10).

Figure 14:
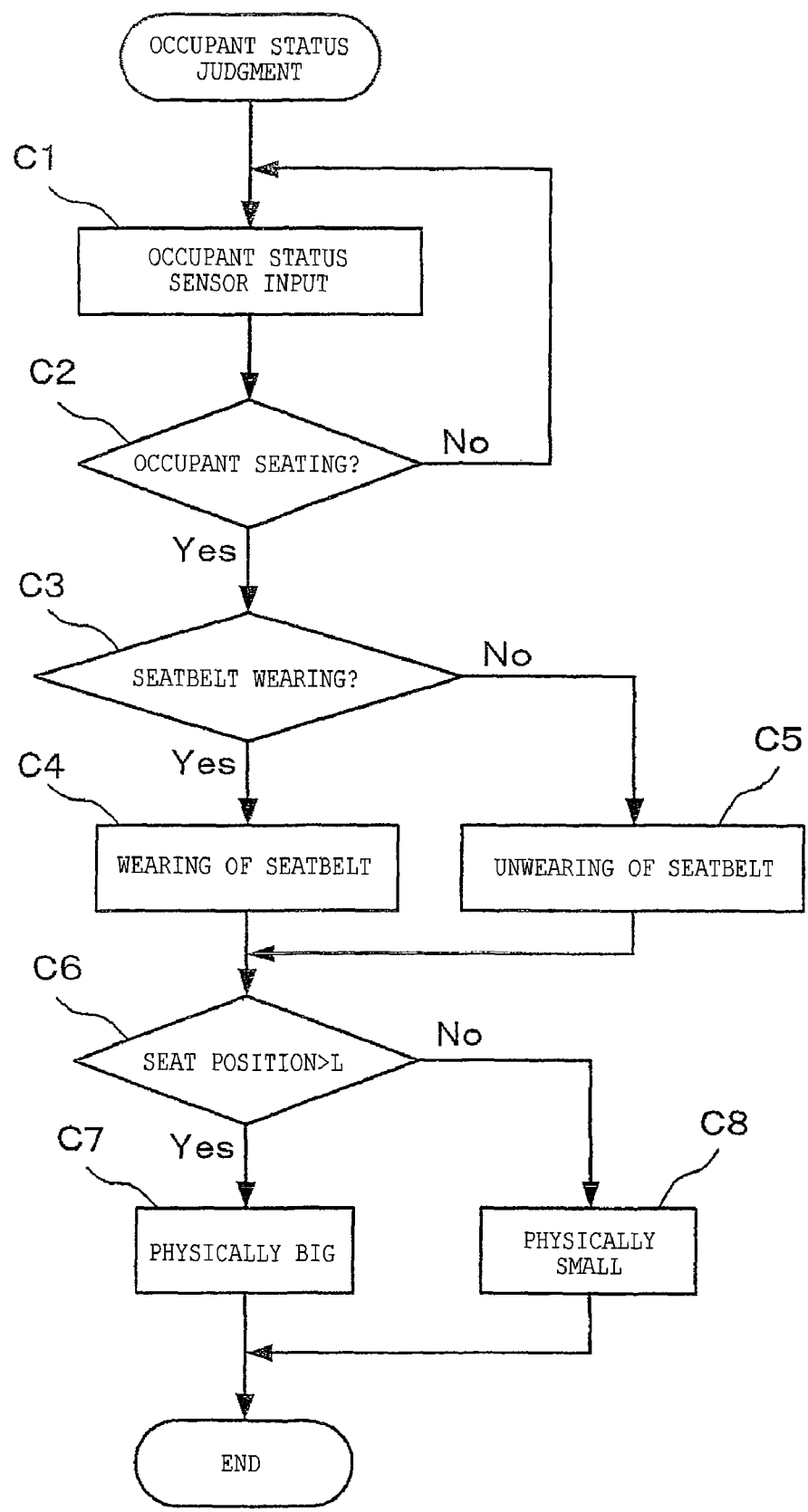
FIG. 14 is a flowchart showing an example of the process of occupant status judgment.

FIG. 14 is a flowchart showing an example of the process of occupant status judgment. The control portion 11 inputs a signal from occupant status sensors 6 (Step C1). Then, when it is judged that no occupant is seated (Step C2; No), the process to input a signal from the occupant status sensors 6 is repeated by returning to Step C1.

When an occupant is seated (Step C2; Yes), it is judged whether or not the occupant wears a seatbelt (Step C3). The judgment of whether or not the occupant wears a seatbelt is made based on, for example, a picture of the seatbelt extracted from the image of the occupant camera 6A or the withdrawn amount of the seatbelt detected by the belt sensor 6D. When the occupant wears a seatbelt (Step C3; Yes), "wearing of seatbelt" is set in occupant status (Step C4). When it is judged that the occupant does not wear a seatbelt (Step C3; No), "unwearing of seatbelt" is set in occupant status (Step C5).

After the judgment of seatbelt wearing is made, the control portion 11 judges physical constitution of the occupant. The physical constitution of the occupant is judged by, for example, the seat position (Step C6). If the value indicating the seat position (for example, the distance from the dashboard) is larger than a given value L (Step C6; Yes), the occupant is judged to be physically big and "physically big" is set in occupant status (Step C7). If the value indicating the seat position is equal to or less than the given value L (Step C6; No), "physically small" is set in occupant status (Step C8).

Besides the seat position, the physical constitution of an occupant may be judged by occupant weight, withdrawn amount of a seatbelt, or an image of an occupant camera 6A. Alternatively, the physical constitution of an occupant may be allowed to be set in more graded levels.

Figure 15:
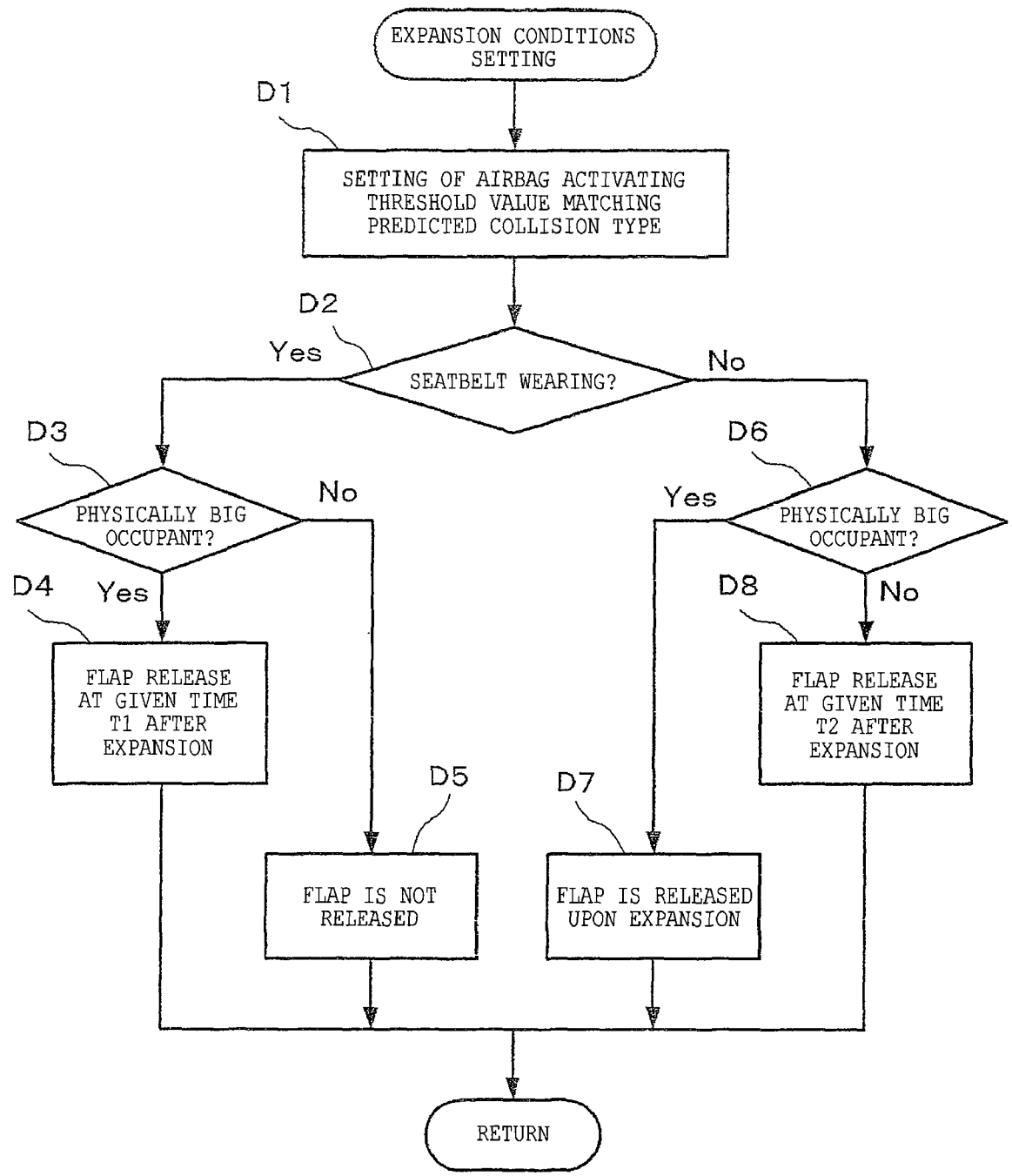
FIG. 15 is a flowchart showing an example of the process to set the conditions for expanding an airbag.

FIG. 15 is a flowchart showing an example of the process to set the conditions for expanding the airbag 7A. The control portion 11 sets such an airbag activating threshold value as to match at least a predicted collision type with reference to the predicted type and strength of collision 55 (Step D1).

Next, expansion conditions are set based on occupant status data 56. For example, it is categorized by whether or not an occupant wears a seatbelt. Then, the expansion conditions are set at the respective cases depending on the physical constitution of the occupant. When the occupant wears a seatbelt (Step D2; Yes), the physical constitution of the occupant is judged (Step D3). If the occupant is physically big (Step D3; Yes), the expansion condition is set, for example, so that the flap 73 is released when a given time t1 passes after the airbag 7A expands (Step D4). When the occupant wears a seatbelt and is physically small (Step D3; No), the expansion condition is set, for example, so that the flap 73 is not released (Step D5).

Also when the occupant does not wear a seatbelt (Step D2; No), the physical constitution of the occupant is judged (Step D6). And, if the occupant is physically big (Step D6; Yes), the expansion condition is set, for example, so that the flap 73 is released at the same time when the airbag 7A expands (Step D7). If the occupant is physically small (Step D6; No), the expansion condition is set, for example, so that the flap 73 is released when a given time t2 passes after the airbag 7A expands (Step D8).

As described above with reference to the flowcharts of FIGS. 12 to 15, a collision type is predicted and occupant status is judged. Then, based on the collision type and occupant status, the conditions for expanding the airbag 7A are set. The expansion of the airbag 7A is held on standby with the conditions ready for expanding the airbag 7A, and when predetermined conditions are realized, the airbag 7A expands.

Figure 16:
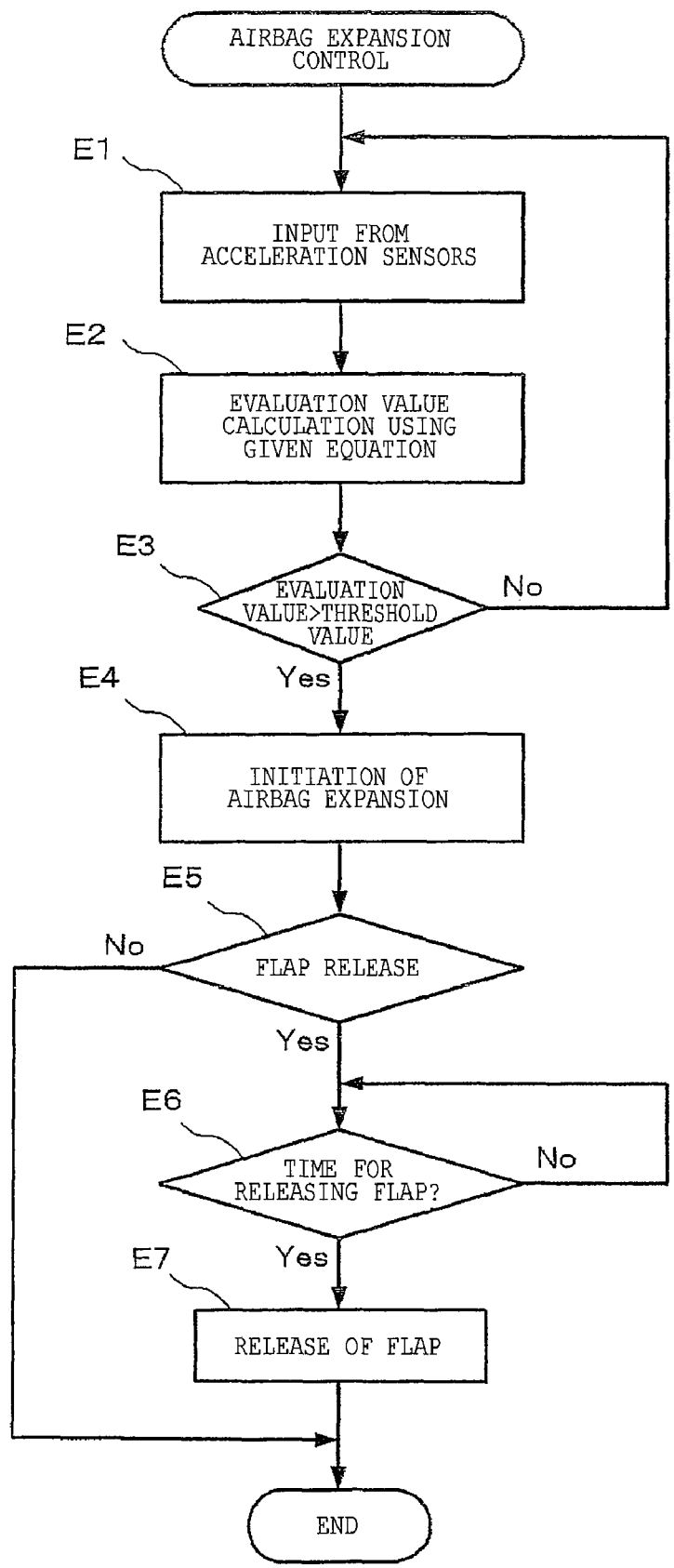
FIG. 16 is a flowchart showing an example of the process of airbag expansion control.

FIG. 16 is a flowchart showing an example of the process of airbag expansion control. The control portion 11 inputs signals from acceleration sensors 4 (Step E1), and calculates evaluation values using a given equation which has been set in expansion conditions (Step E2). Then, it is judged whether or not the evaluation values exceed a threshold value which has been set in the expansion conditions (Step E3).

If evaluation values do not exceed the threshold value (Step E3; No), the same process is repeated from inputting the signals of the acceleration sensors 4 by returning to Step E1. If a evaluation value exceeds the threshold value (Step E3; Yes), the expansion of the airbag 7A is activated (Step E4). Then, if releasing of the flap 73 has not been set (Step E5; No), the processing ends.

If releasing of the flap 73 has been set (Step E5; Yes), the time to release the flap 73 is awaited (Step E6; No). When the time to release the flap 73 comes (Step E6; Yes), an igniter 74 of the airbag device 7 is activated to release the flap 73 (Step E7).

According to the occupant restraint apparatus 20 of the present invention, expansion of an airbag 7A and gas discharging characteristic are controlled to meet a collision type, and the restraint apparatus can be controlled so that the force to be applied to a nearby occupant becomes optimum in correspondence with the conditions of collision. Furthermore, since the conditions for expanding the airbag 7A such as gas discharging and the like can be set in accordance with occupant status such as whether or not a seatbelt is worn, physical constitution and posture of the occupant, and the like, it is possible to control the restricting force to match the occupant.

Moreover, it is also possible to control the size of the opening 70 of the airbag 7A and/or the degree of opening of the airbag 7A by whether or not one flap 73 is released. As a result, a method of controlling the airbag 7A using a simple structure is provided.

It is noted that the above construction of hardware and flowcharts are described by way of example and can be altered or modified arbitrarily.

The central portion for executing processes of the control device 1, which consists of a control portion 11, a main storage portion 12, an external storage portion 13, an output portion 14, an input portion 15, a transmit/receive portion 16, a clock portion 17, an internal bus 10 and the like, can be implemented using a normal computer system, instead using a particular system. For example, a control device 1 that executes the above processes may be configured by distributing a recording medium (flexible disc, CD-ROM, DVD-ROM, or the like) in which the computer program for executing the above processes is stored and which is possible to be read by a computer, and by installing the computer program in the computer. A control device 1 may alternatively be configured by storing the computer program in a storage device which is contained in a server machine on a communications network such as the Internet or the like, and by being downloaded using a normal computer system.

In addition, in the case when the function of the control device 1 is implemented by sharing between an OS (operating system) and application programs, or by cooperating of an OS and application programs, the part of the application programs may be stored in the recording medium or storage device.

It is also possible to distribute through a communications network by superimposing the computer program on a carrier wave. For example, the computer program may be posted to a bulletin board on a communications network (BBS, Bulletin Board System) and distributed through the network. Then, a system for executing the above processes may be configured by starting the computer program and executing it as in the case of other application programs under control of an OS.

What is claimed is:

1. A method for controlling an occupant restraint apparatus, the method comprising:
   detecting an obstacle in a travelling direction of a vehicle that may potentially collide with the vehicle;
   predicting a type of collision between the obstacle detected and the vehicle;
   setting conditions for expanding an airbag of the vehicle based on the collision type predicted; and
   controlling both of the expansion of the airbag and gas discharge from the airbag according to the conditions set by attaching one end of a flap to the airbag and based on the conditions set either:
      holding the other end of the flap as the airbag is expanding to restrict the expansion size of the airbag and to overlap a large vent of the flap with an opening in the airbag to increase flow of gas out therefrom, or releasing the other end of the flap as the airbag is expanding to increase the expansion size of the airbag and to overlap a small vent of the flap with the airbag opening to decrease flow of gas out therefrom.

2. The method of claim 1, wherein detecting the obstacle comprises detecting the position and relative speed of the obstacle with respect to the vehicle based on images of views in the travelling direction of the vehicle.

3. The method of claim 1, wherein detecting the obstacle comprises detecting the position and relative speed of the obstacle with respect to the vehicle using a noncontact distance detecting device.

4. The method of claim 1, wherein predicting the type of collision comprises predicting any one of a full-wrap frontal collision, an offset frontal collision, a diagonal collision, a pole frontal collision and a rollover.

5. The method of claim 1, wherein setting the conditions for expanding the airbag comprises setting a threshold value of impact force for activating an inflator of the airbag.

6. The method of claim 1, wherein setting the conditions for expanding the airbag comprises setting an area of the opening provided in the airbag and predetermined time to change the opening area.

7. The method of claim 1, wherein setting the conditions for expanding the airbag comprises setting a predetermined time to release a device for restricting the size of the expanded airbag.

8. The method for controlling an occupant restraint apparatus according of claim 1, further comprising:
   detecting status of an occupant of the vehicle before the setting of the conditions for expanding the airbag, and wherein setting the conditions for expanding the airbag is based on both the collision type and the occupant status.

9. An occupant restraint apparatus comprising:
   an obstacle detecting device for detecting a position and relative speed of an obstacle with respect to a vehicle with the obstacle being in a travelling direction of the vehicle and potentially corning into collision with the vehicle;
   a collision predicting device for predicting a type of collision between the obstacle detected by the obstacle detecting device and the vehicle;
   a setting device for setting conditions for expanding an airbag of the vehicle based on the collision type predicted by the collision predicting device; and
   an expansion controlling device including a flap member for controlling both the expansion size of the airbag and gas discharge from the airbag according to the conditions set by the setting device, wherein the flap member has one end fixed to the airbag and another end releasably connected to an inflator device for the airbag and has smaller and larger vents with one or the other of the vents being overlapped with an opening in the airbag depending on whether the other end of the flap member is connected or released from the inflator device based on the conditions set by the setting device.

10. The occupant restraint apparatus according to claim 9, further comprising:
   an occupant detecting device for detecting status of an occupant of the vehicle, with the setting device setting the conditions for expanding the airbag based on both the collision type and the occupant status.

11. The occupant restraint apparatus of claim 9 wherein the object detecting device comprises a sensor that detects the object prior to contact between the object and vehicle.

12. The occupant restraint apparatus of claim 9 wherein the setting device sets a threshold level of impact force for deployment of the airbag based on the predicted collision type.

* * * * *

UNITED STATES PATENT AND TRADEMARK OFFICE
CERTIFICATE OF CORRECTION

| | | |
|---|---|---|
| PATENT NO. | : 7,925,403 B2 | Page 1 of 1 |
| APPLICATION NO. | : 12/047971 | |
| DATED | : April 12, 2011 | |
| INVENTOR(S) | : Masayoshi Kumagai et al. | |

It is certified that error appears in the above-identified patent and that said Letters Patent is hereby corrected as shown below:

Claim 8, Column 16, Line 24, delete "of" and insert -- to --.

Claim 9, Column 16, Line 33, delete "corning" and insert -- coming --.

Signed and Sealed this
Twenty-eighth Day of June, 2011

David J. Kappos
*Director of the United States Patent and Trademark Office*